United States Patent
Nakatsugawa et al.

(10) Patent No.: US 10,193,791 B2
(45) Date of Patent: Jan. 29, 2019

(54) METHOD OF ALLOCATING WAVELENGTH AND WAVELENGTH ALLOCATION DEVICE

(71) Applicant: FUJITSU LIMITED, Kawasaki-shi, Kanagawa (JP)

(72) Inventors: Keiichi Nakatsugawa, Shinagawa (JP); Akiko Yamada, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 15/018,938

(22) Filed: Feb. 9, 2016

(65) Prior Publication Data
US 2016/0261936 A1 Sep. 8, 2016

(30) Foreign Application Priority Data
Mar. 6, 2015 (JP) .................................. 2015-045275

(51) Int. Cl.
| | |
|---|---|
| H04J 14/02 | (2006.01) |
| H04L 12/721 | (2013.01) |
| H04L 12/707 | (2013.01) |
| H04L 12/729 | (2013.01) |
| H04B 10/038 | (2013.01) |

(52) U.S. Cl.
CPC ........ *H04L 45/123* (2013.01); *H04J 14/0257* (2013.01); *H04L 45/125* (2013.01); *H04L 45/22* (2013.01); *H04L 45/62* (2013.01); *H04B 10/038* (2013.01)

(58) Field of Classification Search
None
See application file for complete search history.

(56) References Cited

U.S. PATENT DOCUMENTS

| | | | | |
|---|---|---|---|---|
| 6,385,206 | B1* | 5/2002 | Nakata | H04J 14/0227 14/227 |
| 6,768,718 | B1* | 7/2004 | Beshai | H04L 45/00 370/237 |
| 7,206,511 | B1* | 4/2007 | Hill | H04J 3/12 398/153 |

(Continued)

FOREIGN PATENT DOCUMENTS

| | | |
|---|---|---|
| JP | 2003-258886 | 9/2003 |
| JP | 2012-502584 A | 1/2012 |

(Continued)

OTHER PUBLICATIONS

JPOA—Japanese Office Action dated Sep. 25, 2018 for Japanese Patent Application No. 2015-045275, with English translation.

*Primary Examiner* — Kenneth N Vanderpuye
*Assistant Examiner* — Jai M Lee
(74) *Attorney, Agent, or Firm* — Fujitsu Patent Center

(57) ABSTRACT

A wavelength allocation device includes a decision unit, a determination unit, and an evaluation unit. The decision unit decides whether a wavelength bandwidth of an optimum route for a demand has a free bandwidth to which the demand can be allocated. The determination unit allocates the demand to a bypass route, in the case that the wavelength bandwidth of the optimum route does not have the free bandwidth in the decision unit. The evaluation unit integrates the degree of influence of a section on the optimum route, which becomes a bypass factor, based on a difference in a route cost between the optimum route and the bypass route for the demand.

5 Claims, 17 Drawing Sheets

(56) References Cited

U.S. PATENT DOCUMENTS

| | | | |
|---|---|---|---|
| 7,760,738 B1* | 7/2010 | Chamas | H04L 12/4675 370/238 |
| 7,769,296 B1* | 8/2010 | Chiu | H04J 14/0201 385/16 |
| 8,676,956 B1* | 3/2014 | Johnson | H04L 43/0876 359/206.1 |
| 8,897,306 B2* | 11/2014 | Hayashi | H04L 12/5695 370/237 |
| 9,077,478 B1* | 7/2015 | Schmidtke | H04J 14/0268 14/268 |
| 2003/0135645 A1* | 7/2003 | Oki | H04L 43/00 709/238 |
| 2003/0161633 A1 | 8/2003 | Oki et al. | |
| 2005/0063299 A1* | 3/2005 | Atkinson | H04J 14/0227 14/227 |
| 2006/0159454 A1* | 7/2006 | Bjornstad | H04J 14/0227 14/2 |
| 2007/0195700 A1* | 8/2007 | Katoh | H04L 41/147 370/235 |
| 2009/0296719 A1* | 12/2009 | Maier | H04L 45/12 370/400 |
| 2010/0061719 A1 | 3/2010 | Monga et al. | |
| 2011/0085469 A1* | 4/2011 | Klincewicz | H04L 41/145 370/254 |
| 2011/0292949 A1 | 12/2011 | Hayashi et al. | |
| 2012/0140635 A1* | 6/2012 | Aoki | H04L 45/125 370/238 |
| 2012/0170928 A1* | 7/2012 | Tanaka | H04B 10/2557 398/28 |
| 2013/0077478 A1 | 3/2013 | Matsuura | |
| 2013/0077960 A1 | 3/2013 | Monga et al. | |
| 2013/0182574 A1* | 7/2013 | So | H04L 47/122 370/236 |
| 2013/0208599 A1* | 8/2013 | Mashimo | H04L 45/125 370/238 |
| 2014/0093246 A1* | 4/2014 | Sambo | H04J 14/0201 398/83 |

FOREIGN PATENT DOCUMENTS

| | | |
|---|---|---|
| JP | 2013-070200 A | 4/2013 |
| JP | 2013-168732 A | 8/2013 |
| JP | 2014-150440 A | 8/2014 |
| WO | 2009/025329 A1 | 2/2009 |
| WO | 2010/030435 A1 | 3/2010 |

* cited by examiner

METHOD OF ALLOCATING WAVELENGTH AND WAVELENGTH ALLOCATION DEVICE

CROSS-REFERENCE TO RELATED APPLICATION

This application is based upon and claims the benefit of priority of the prior Japanese Patent Application No. 2015-045275, filed on Mar. 6, 2015, the entire contents of which are incorporated herein by reference.

FIELD

The embodiments discussed herein are directed to a method of allocating a wavelength and a wavelength allocation device.

BACKGROUND

For example, in large-scale backbone networks of telecommunication carriers, optical networks (NW) to which the wavelength division multiplexing (WDM) technology is applied have been built. The WDM technology is a technology to accommodate a plurality of user traffics in optical signals of different wavelengths among nodes connected with optical fibers, and to multiplex the plurality of optical signals into one optical fiber and transfer the signals in large capacity.

As an example of a technical standard of the optical NW, there is an optical transport network (OTN). The OTN includes two types of paths including an electric layer path and a wavelength path. The electric layer path is a path set between bases where users perform communication in an end-to-end manner, and which accommodates traffic. Further, the wavelength path is a path set between nodes where WDM transfer is executed, and obtained such that a plurality of electric layer paths is multiplexed and mapped into optical signals of different wavelengths. The OTN builds a high-speed and flexible optical NW, using these two types of paths.

However, in recent years, expectation to introduce software defined networking (SDN) has been increasing, which realizes management and control of the NW with software. The optical NW is also demanded to support the SDN to enable store flexible and dynamic control.

In the SDN, a use request from a user or various applications to the optical NW, that is, a request of demand, becomes easy. Therefore, a demand of traffic, for example, the number of wavelength links used between the nodes is dynamically changed according to a time zone. For example, the traffic of the optical NW largely varies by a rapid increase in the demand such as distribution of popular content, and the like.

FIGS. 17A to 17D are explanatory diagrams illustrating an example of a path configuration of an optical transfer system. The optical transfer system illustrated in FIGS. 17A to 17D builds the optical NW that connects five nodes including the first to fifth nodes 100A to 100E with an optical fiber 101. The first node 100A is connected with the second node 100B, using the optical fiber 101 of a first section 101A, and is connected with the fifth node 100E, using the optical fiber 101 of a fifth section 101E. The second node 100B is connected with the third node 100C, using the optical fiber 101 of a second section 101B, and is connected with the fifth node 100E, using the optical fiber 101 of a sixth section 101F. The third node 100C is connected with the fourth node 100D, using the optical fiber 101 of a third section 101C. The fourth node 100D is connected with the fifth node 100E, using the optical fiber 101 of a fourth section 101D.

The optical NW in a time zone t1 accommodates, as illustrated in FIG. 17A, a demand D101 in the first section 101A, a demand D102 in the sixth section 101F, and a demand D103 in the third section 101C.

Next, as illustrated in FIG. 17B, assume that, in the optical NW in a time zone t2, a demand D104 from the first node 100A to the third node 100C has newly occurred, and a demand D105 from the fourth node 100D to the fifth node 100E has newly occurred. The optical NW accommodates the demand D104 in the first section 101A and the second section 101B, and accommodates the demand D105 in the fourth section 101D. As a result, a traffic amount in the first section 101A is further increased as well as that in the fourth section 101D, compared with those in the time zone t1.

Further, as illustrated in FIG. 17C, assume that, in the optical NW in a time zone t3, a demand D106 from the first node 100A to the third node 100C has newly occurred, and a demand D107 from the first node 100A to the fifth node 100E has newly occurred. The optical NW accommodates the demand D106 in the first section 101A and the second section 101B, and accommodates the demand D107 in the fifth section 101E. As a result, the traffic amounts of the first section 101A and the second section 101B are further increased, compared with those in the time zone t2.

Further, as illustrated in FIG. 17D, assume that, in the optical NW in a time zone t4, a demand D108 from the first node 100A to the second node 100B has newly occurred. The optical NW accommodates the demand D108 in the first section 101A. As a result, the traffic amount of the first section 101A is further increased, compared with that in the time zone t3. Therefore, the traffic amounts of the respective sections largely vary according to the increase in the demand.

Therefore, to absorb the varying traffic demand, for example, there is a method of making an upper limit number of all of wavelength links in the nodes active. However, many lasers constantly need to be active, and thus the power consumption is large. Furthermore, when the actual traffic has been decreased than expected, sections with excessive wavelength links occur, and communication efficiency to operation cost is decreased.

Therefore, the optical NW is desired to efficiently use the wavelength resource by dynamically performing addition/deletion of the wavelength links according to an actual use state.

Therefore, for example, as a technology to dynamically perform addition of the wavelength link, a technology to measure a traffic amount transferred in each node, and generate an optical bypass link when congestion is caused in the optical link to detour a part of the traffic is known.

However, when the wavelength link is dynamically added according to the actual use state, the laser needs to be set active every time the wavelength link is added, and it takes a time until the added wavelength link is operated. To secure a stable output of the laser, adjustment of a device temperature and the like takes several, minutes to several tens of minutes of time. Therefore, it takes a time from an instruction of addition of the wavelength link to start of the operation of the wavelength link. Therefore, it is difficult for a route for accommodating the demand to be secured, and a call loss may occur. Therefore, a free bypass route that needs a higher route cost than an optimum route is searched for, and the demand is accommodated in the bypass route, and thus occurrence of the call loss can be suppressed.

Patent Literature 1: Japanese Laid-open Patent Publication No. 2013-168732

Patent Literature 2: Japanese Laid-open Patent Publication No. 2013-70200

Patent Literature 3: International Publication Pamphlet No. WO 2009/025329

Patent Literature 4: Japanese National Publication of International Patent Application No. 2012-502584

In the optical NW, when the section on the optimum route to the demand is insufficient, the bypass route that needs a higher route cost than the optimum route is determined, and the demand is accommodated in the determined bypass route. However, normally, when a new demand has occurred where the bypass route is used as the optimum route, it is difficult for the optimum route to the demand to be secured, and the demand is accommodated in a further bypass route. As a result, a vicious circle that incurs further bandwidth consumption of the route is caused, and the use efficiency of the wavelength resource is decreased.

Further, when a demand from the first node 100A to the third node 100C occurs, the optimum route becomes the first section 101A and the second section 101B. For convenience of description, the route cost between the nodes 100 is calculated by the number of single hops. However, when the first section 101A has an insufficient bandwidth, bypass routes of the fifth section 101E, the fourth section 101D, and the third section 101C are determined. Then, the demand from the first node 100A to the third node 100C is accommodated in the bypass routes of the fifth section 101E, the fourth section 101D, and the third section 101C.

However, normally, the wavelength links of the first section 101A and the second section 101B are enough to accommodate the demand. However, due to insufficiency of the bandwidth of the first section 101A, the bypass routes of the third section 101C, the fourth section 101D, and the fifth section 101E are used. Further, when a new demand, that uses the fourth section 101D as the optimum route occurs, and when the fourth section 101D has already been used as the bypass route of another demand, and has an insufficient bandwidth, a bypass route is searched for the new demand, and the demand is accommodated in the bypass route. That is, if the bandwidth consumption is increased due to the bypass route, it is difficult for the demand occurring afterward to be accommodated in the optimum route and the demand is highly possibly accommodated in the bypass route, and the vicious circle that incurs further bandwidth consumption is caused and the use efficiency of the wavelength resource is decreased.

SUMMARY

According to an aspect of an embodiment, a method of allocating a wavelength includes deciding whether a wavelength bandwidth of an optimum route for a demand has a free bandwidth to which the demand is able to be allocated. The method includes allocating the demand to a bypass route when the wavelength bandwidth of the optimum route does not have the free bandwidth; and integrating the degree of influence of a section on the optimum route, the section not having the free bandwidth, based on a difference in a route cost between the optimum route and the bypass route for the demand.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Note that the disclosed technology is not limited by the present embodiments. Further, the embodiments described below may be appropriately combined within a scope not causing inconsistency.

[a] First Embodiment

Figure 1:
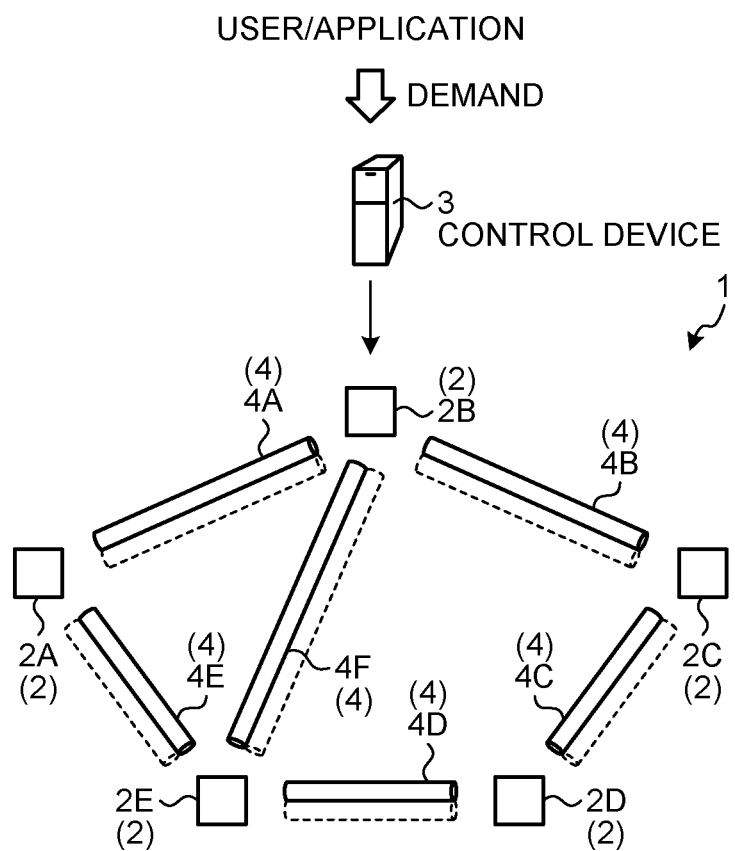
FIG. 1 is an explanatory diagram illustrating an example of an optical transfer system of a first embodiment.

FIG. 1 is an explanatory diagram illustrating an example of an optical transfer system 1 of a first embodiment. The optical transfer system 1 illustrated in FIG. 1 includes five nodes 2 and a control device 3. A first node 2A is connected with a second node 2B, using an optical fiber 4 of a first section 4A, and is connected with a fifth node 2E, using the optical fiber 4 of a fifth section 4E. The second node 2B is connected with a third node 2C, using the optical fiber 4 of a second section 4B, and is connected with the fifth node 2E, using the optical fiber 4 of a sixth section 4F. A third node 2C is connected with a fourth node 2D, using the optical fiber 4 of a third section 4C. The fourth node 2D is connected with the fifth node 2E, using the optical fiber 4 of a fourth section 4D. That is, the first to fifth nodes 2A to 2E are connected by the first to sixth sections 4A to 4F, so that an optical NW is built. The control device 3 then monitors and controls the first to fifth nodes 2A to 2E and the first to sixth sections 4A to 4F.

When the control device 3 has detected a demand of a use request from a user or an application to the optical NW, the control device determines an accommodation route that accommodates the demand in sections of a starting point and an end point of the demand, and requests the nodes 2 on the determined accommodation route to execute path setting of the accommodation route. Typically, a "path" is set across two or more nodes 2, and a "link" is set to two nodes 2 (single hop) directly connected by the optical fiber 4. However, as a path of an end-to-end electric layer, one or a plurality of wavelength paths is used as a link, and transfer is performed. Further, the wavelength path does not return the optical signal to an electrical signal in a relay node, and relays the optical signal as it is, so that the path can be set across three or more nodes 2 (multiple hops). Therefore, for convenience of description, to avoid confusion of the term "path", the wavelength path is called "wavelength link" regardless of the single hop or the multiple hops. Further, the wavelength link is a section between two nodes 2 directly connected by the optical fiber 4, and all of wavelength links are single hops. Note that the optical fiber 4 and the wavelength path are practically bidirectionally set to the sections. However, only a case where the optical fiber 4 and the wavelength path are unidirectionally set to the sections will be described for convenience of description.

Figure 2:
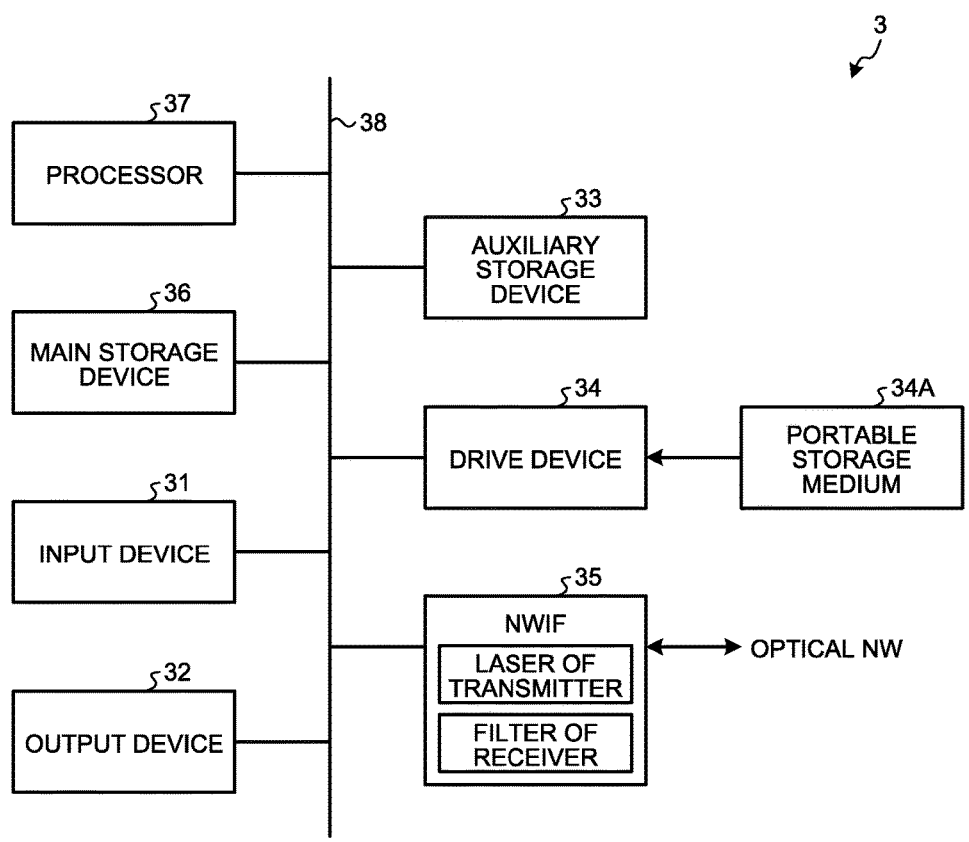
FIG. 2 is a block diagram illustrating an example of a hardware configuration of a control device.

FIG. 2 is a block diagram illustrating an example of a hardware configuration of the control device 3. The control device 3 illustrated in FIG. 2 includes an input device 31, an output device 32, an auxiliary storage device 33, a drive device 34, an NW interface (IF) 35, a main storage device 36, a processor 37, and a bus 38.

The input device 31 is an input interface of pointing devices such as a keyboard and a mouse. The output device 32 outputs a result of processing of the processor 37. For example, the output device 32 is an output interface of an audio output device such as a speaker and a display device.

The auxiliary storage device 33 is an area where various programs, and data used by the processor 37 in executing each of the programs are stored. The auxiliary storage device 33 is a non-volatile memory such as an erasable programmable ROM (EPROM) or a hard disk drive. The auxiliary storage device 33 holds an operating system (OS) and various application programs, for example.

The drive device 34 reads a program or various data recorded in a portable recording medium 34A, and outputs the read program or data to the processor 37. The portable recording medium 34A is a recording medium such as an SD card, a mini SD card, a micro SD card, a universal serial bus (USB) flash memory, a compact disc (CD), a digital versatile disc (DVD), or a flash memory card.

The NWIF 35 is a communication interface that controls communication of information with the optical NW. The NWIF 35 includes a communication interface connected with a wired NW and a wireless NW. The NWIF 35 is, for example, a network interface card (NIC) and a wireless local area network (LAN) card.

The main storage device 36 is a semiconductor memory such as a random access memory (RAM) corresponding to a storage area and a work area of the processor 37, where the program stored in the auxiliary storage device 33 is loaded.

The processor 37 is a central processing unit (CPU) that controls the entire control device 3. The processor 37 executes various types of processing by loading the OS held in the auxiliary storage device 33 or the portable recording medium 34A and various application programs to the main storage device 36 and executing the loaded OS and application programs. The processor 32 is not limited to one, and a plurality of the processors 37 may be used.

When data is input through the NWIF 35, the input device 31 is not necessarily provided. Similarly, when data is output through the NWIF 35, the output device 32 is not necessarily provided in HA, OFC, or OFS.

Figure 3:
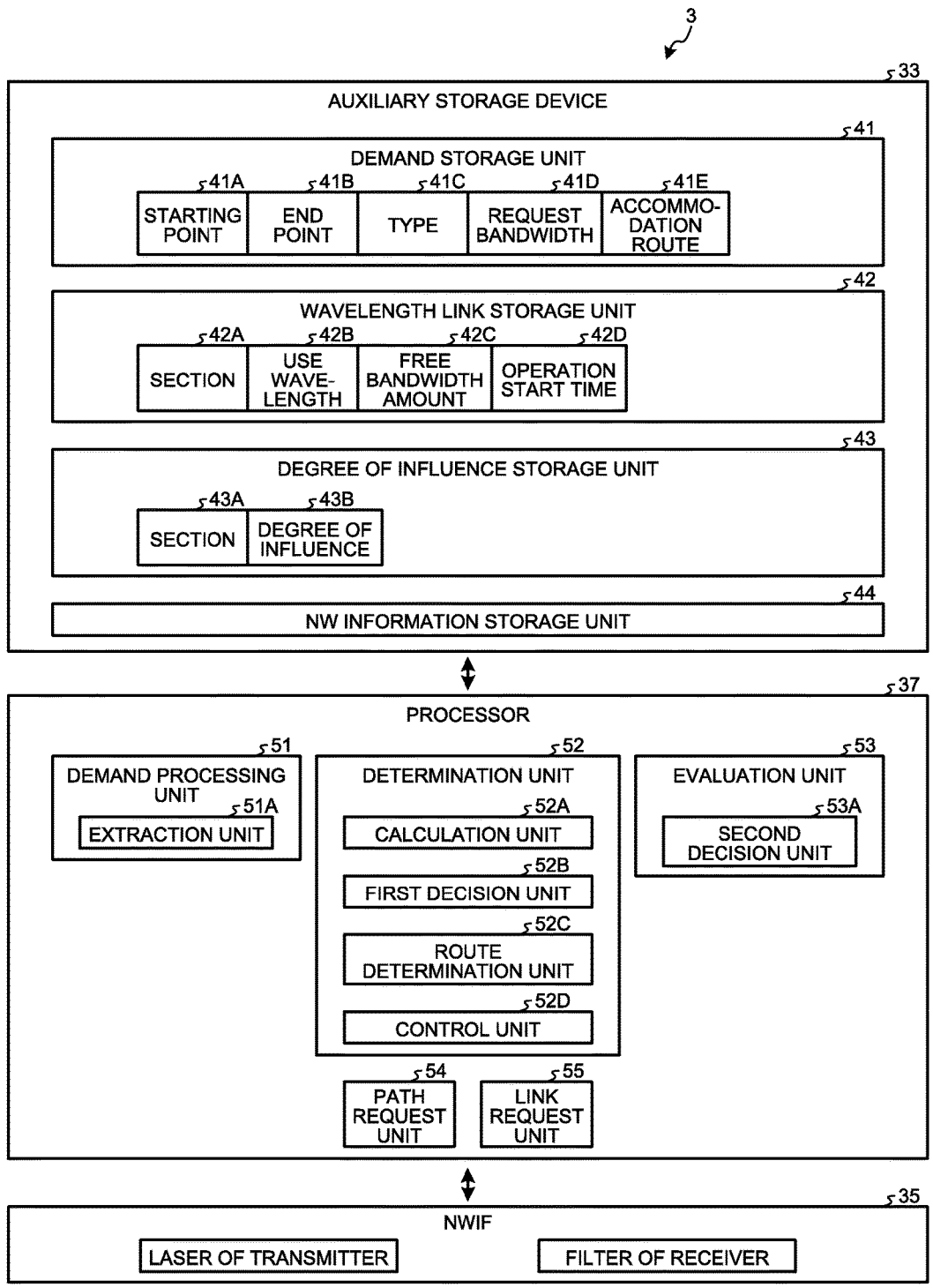
FIG. 3 is a block diagram illustrating an example of functional configurations of the control device.

FIG. 3 is a block diagram illustrating an example of functional configurations in the control device 3. The auxiliary storage device 33 illustrated in FIG. 3 includes a demand storage unit 41, a wavelength link storage unit 42, a degree of influence storage unit 43, and an NW information storage, unit 44. The processor 37 includes, as functions, a demand processing unit 51, a determination unit 52, an evaluation unit 53, a path request unit 54, and a link request unit 55.

The demand storage unit 41 manages, for each demand, a starting point 41A, an end point 41B, a type 41C, a request bandwidth 41D, and an accommodation route 41E, in association with one another. The starting point 41A is information that identifies the node 2 of a starting point of a demand. The end point 41B is information that identifies the node 2 of an end point of the demand. The type 41C is information that identifies a type of the demand. Note that the type 41C includes instant-type information, reservation-type information, momentary interruption toleration-type information, and momentary interruption non-toleration-type information. The instant-type information is a demand of a type instantly accommodated in the determined accommodation route. The reservation-type information is a demand of a reservation type accommodated in the determined accommodation route in a prior use start time. Further, the momentary interruption toleration-type information is a demand of a type that can permit momentary interruption, and the momentary interruption non-toleration-type information is a demand of a type that doesn't permit the momentary interruption of a phone call. The request bandwidth 41D is a bandwidth amount requested by the demand. The accommodation route 41E is a route allocated to the demand, that is, a route that accommodates the demand. Note that the accommodation route 41E includes route information such as the first node 2A—the second node 2B—the third node 2C, and information that identifies whether a present route is the bypass route.

The wavelength link storage unit 42 is an area in which information of each wavelength link is stored. The wavelength link storage unit 42 manages a section 42A, a free bandwidth amount 42C of each use wavelength 420 in the section 42A, and an operation start time 42D, in association with one another. The section 42A is a section defined by the node 2 of the starting point and the node 2 of the end point, for example, the first to sixth sections 4A to 4F. The use wavelength 42B is information that identifies a used or unused wavelength in the section 42A. The free bandwidth amount 42C is a free bandwidth amount of the use wavelength. The operation start time 42D is a start time that considers a time used from a link request of addition, of the wavelength link described below to operation start when the wavelength link can be operated.

The degree of influence storage unit 43 is an area in which the degree of influence 43B is stored for each section 43A on the optimum route, which is the bypass factor, when it is difficult for the demand to be accommodated in the optimum route to which at least one or more wavelength links are set, and the bypass route accommodates the demand. The degree of influence 43B means the degree of inefficiency of the resource incurred by the section of the bypass factor. The degree of influence of the section becomes larger as the section generates a larger number of demands that are to be accommodated in the bypass route, due to insufficiency of the free bandwidth of the section. Further, the degree of influence 43B is an accumulated value of differences of the route cost between the optimum route and the bypass route, in association with the section on the optimum route, which is the bypass factor.

The NW information storage unit 44 is an area in which NW information in the optical NW is stored. The NW information is information related to a topology configuration of a physical optical NW in which the nodes 2 in the optical NW are connected by the optical fiber 4, identifiers of the nodes 2, usable optical wavelengths by the nodes 2, a maximum number of usable wavelengths by the nodes 2, and the like.

The demand processing unit 51 is a processing unit that analyzes the demand D in response to a demand request. Note that the demand D includes demand information such as the node 2 that requests use of the optical NW, the starting point and the end point of a port, quality of service (QOS) parameters including a permissible delay and a request bandwidth. The demand processing unit 51 includes an extraction unit 51A. The extraction unit 51A extracts the demand information such as the starting point, the end point, and the QOS parameters in the demand D, and stores the extracted demand information in the demand storage unit 41.

The determination unit 52 determines a route to which the demand is to be allocated, that is, a route in which the demand is to be accommodated. The evaluation unit 53 is a processing unit that evaluates the degree of influence of each section that is the bypass factor of the optimum route of when the demand is accommodated in the bypass route other than the optimum route. The path request unit 54 requests the nodes 2 on the accommodation route to execute path setting in order to accommodate the demand, in the accommodation route determined in the determination unit 52. The link request unit 55 requests the node 2 to add the wavelength link.

The determination unit 52 includes a calculation unit 52A, a first decision unit 52B, a route determination unit 52C, and a control unit 52D. The calculation unit 52A calculates the optimum route with the minimum route cost for the demand D, based on the starting point, the end point, and the QOS parameters of the demand D in the demand storage unit 41, and the wavelength link information in the wavelength link, storage unit 42. Note that, for the route calculation, various route calculation algorithms, for example, algorithms such as a shortest route (shortest path first) that selects a route with the minimum route cost are used. For convenience of description, the route cost of each section is "1". For example, the optimum route from the first node 2A to the third node 2C in the optical NW illustrated in FIG. 1 is a two-hop route of the first section 4A and the second section 4B. Therefore, the route cost becomes "2".

When the calculation unit 52A has calculated the optimum route for the demand D, the first decision unit 52B decides whether the demand D can be accommodated in the section on the calculated optimum route, based on the free bandwidth amount of the wavelength link information of the section on the optimum route. That is, the first decision unit 52B decides whether there is the free bandwidth to which the request bandwidth of the demand D can be allocated, in the wavelength link in the section on the optimum route. When the demand D can be accommodated in the section on the optimum route in the first decision unit 52B, the route determination unit 52C determines the optimum route as the accommodation route of the demand D. The path request unit 54 requests the nodes 2 in the sections on the accommodation route to execute path setting in order to accommodate the demand D in the accommodation route determined in the route determination unit 52C. When the demand D cannot be accommodated in the section on the optimum route in the first decision unit 52B, the calculation unit 52A calculates the bypass route with a next minimum route cost to the optimum route.

The route determination unit 52C then decides whether the demand D can be accommodated in the bypass route calculated in the calculation unit 52A. When the demand D can be accommodated in the bypass route calculated in the calculation unit 52A, the route determination unit 52C determines the bypass route as the accommodation route of the demand D. The path request unit 54 requests the nodes 2 of the sections on the accommodation route to execute path setting in order to accommodate the demand D in the accommodation route determined in the route determination unit 52C.

When the demand D has been accommodated in the section on the accommodation route determined in the route determination unit 52C, the control unit 52D updates the wavelength link information of each section in the wavelength link storage unit 42 in order to update the free bandwidth amount of each wavelength link of each section in the optical NW. When the demand D has been accommodated in the bypass route, the evaluation unit 53 calculates the degree of influence of the section on the optimum route, which is the bypass factor, based on the difference in the route cost between the optimum route for the demand D and the bypass route. When the route cost of the optimum route is "2" and the route cost of the bypass route is "3", the evaluation unit 53 adds "1", that is the difference in the route cost between the optimum route "2" and the bypass route "3" to the degree of influence "1" of the section on the optimum route, and updates the degree of influence of the section of the bypass factor in the degree of influence storage unit 43.

The evaluation unit 53 includes a second decision unit 53A. The second decision unit 53A decides whether the degree of influence 43B of each section 43A of the bypass factor is a predetermined value or more, based on the degree of influence 43B of each section 43A in the degree of influence storage unit 43. Note that the predetermined value is "2", for example.

When the degree of influence 43B of the section 43A is the predetermined value or more in the second decision unit 53A, the link request unit 55 decides that the degree of influence provided to other sections is high because the section has an insufficient bandwidth. Further, the link request unit 55 decides whether there is the wavelength link that can be added to the section with the degree of influence being the predetermined value or more, based on the wavelength link information in the wavelength link storage unit 42 and the NW information in the NW information storage unit 44. When there is the wavelength link that can be added to the section with the degree of influence being the predetermined value or more, the link request unit 55 requests the nodes 2 on the section to add the wavelength link. The path request unit 54 requests the nodes 2 on the accommodation route to execute path setting such as switching and multiplexing/demultiplexing in order to accommodate the demand in the accommodation route determined in the route determination unit 52C.

The NWIF 35 is an interface that controls communication with the nodes 2 in the optical NW, and for example, collects instructions of path setting and addition of the wavelength link, the bandwidth information of the wavelength link of each section, and the use wavelength. The NWIF 35 notifies the nodes 2 in the optical NW of the instructions of path setting and addition of the wavelength link, with a protocol message in transaction language 1 (TL1) or open flow.

When the node 2 has received a request of addition of the wavelength link from the link request unit 55 of the control device 3, the node 2 sets a laser in a transmission unit (not illustrated) to be active and adjusts the device temperature, thereby to stably output the added wavelength. Further, when the node 2 has received a request of addition of the wavelength link from the link request unit 55 of the control device 3, the node 2 controls a wavelength filter in a reception unit (not illustrated) to extract the added wavelength. Each node 2 executes the path setting to accommodate the demand in the accommodation route when the node 2 has received the path setting from the path request unit 54 of the control device 3.

Figure 4:
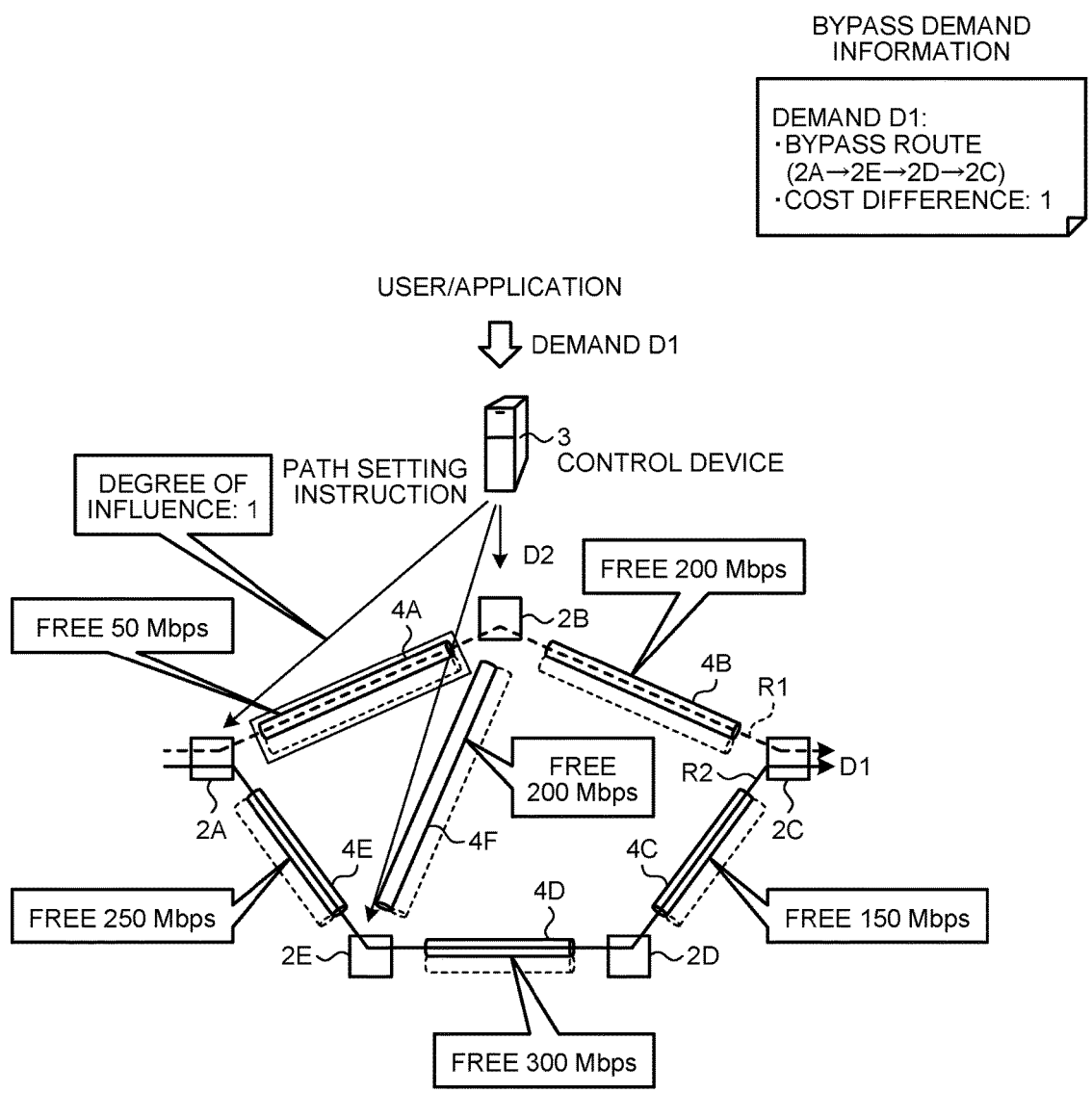
FIG. 4 is an explanatory diagram illustrating an example of a path configuration of the optical transfer system, at the time of occurrence of a demand D1.

Next, an operation of the optical transfer system 1 of the first embodiment will be described. FIG. 4 is an explanatory diagram illustrating an example of a path configuration of the optical transfer system 1 at the time of occurrence of the demand D1. In the optical transfer system 1 illustrated in FIG. 4, minimum wavelength links are set by default, and one wavelength link is set to each of the first to sixth sections 4A to 4F, at the time of startup of the system. Then, assume that the control device 3 has detected the demand D1. In the demand D1, the starting point is the first node 2A, the end point is the third node 2C, and the request bandwidth is 100 Mbps. In the optical NW of FIG. 4, another demand has already been accommodated in the first section 4A, and thus the free bandwidth amount of the first section 4A is 50 Mbps, the free bandwidth amount of the second section 4B is 200 Mbps, and the free bandwidth amount of the third section 4C is 150 Mbps. Further, the free bandwidth amount of the fourth section 4D is 300 Mbps, the free bandwidth amount of the fifth section 4E is 250 Mbps, and the free bandwidth amount of the sixth section 4F is 200 Mbps.

When the calculation unit 52A in the processor 37 in the control device 3 has detected the demand D1, the calculation unit 52A calculates a candidate route R1 (2A→2B→2C) of the optimum route of the demand D1, based on the starting point, the end point, and the QOS parameters in the demand D1. The candidate route R1 is a two-hop route of the first section 4A and the second section 4 Bandwidth thus the route cost is "2". The first decision unit 52B decides that it is difficult for the demand D1 to be accommodated in the candidate route R1 because the demand D1 is 100 Mbps, and the free bandwidth amount of the first section 4A on the candidate route R1 is 50 Mbps. The route determination unit 52C requests the calculation unit 52A to re-calculate the candidate route because it is difficult for the demand D1 to be accommodated in the candidate route R1.

The calculation unit 52A calculates a candidate route R2 (2A→2E→2D→2C) of the bypass route with the next minimum route cost to the candidate route R1. The candidate route R2 is three-hop route of the fifth section 4E, the fourth section 4D, and the third section 4C, and thus the route cost is "3". The first decision unit 52B decides that the demand D1 can be accommodated in the candidate route R2 because the free bandwidth amount of the fifth section 4E, the fourth section 4D, and the third section 4C of the candidate route R2 is equal to or larger than 100 Mbps that is the bandwidth request of the demand D1. The route determination unit 52C determines the candidate route R2 as the accommodation route in which the demand D1 is accommodated. The path request unit 54 then requests the nodes 2 on the candidate route R2, that is, the first node 2A, the fifth node 2E, the fourth node 2D, and the third node 2C to execute path setting to accommodate the demand D1. The control unit 52D then updates the free bandwidth amount in each section in the optical NW and stores the updated amounts in the wavelength link storage unit 42.

The evaluation unit 53 stores the cost difference "1" between the route cost "2" of the optimum route R1 of the demand D1 and the route cost "3" of the bypass route R2 in the degree of influence storage unit 43, as the degree of influence, in association with the first section 4A that is the bypass factor. Note that the degree of influence is updated in units of sections, rather than in units of wavelength link. For convenience of description, when the optimum route is the first section 4A and the second section 4B, the degree of influence corresponding to the first section 4A is updated because the first section 4A has an insufficient bandwidth. However, when the second section 4B has also an insufficient bandwidth for the demand D1, the degree of influence corresponding to the second section 4B is also updated.

Figure 5:
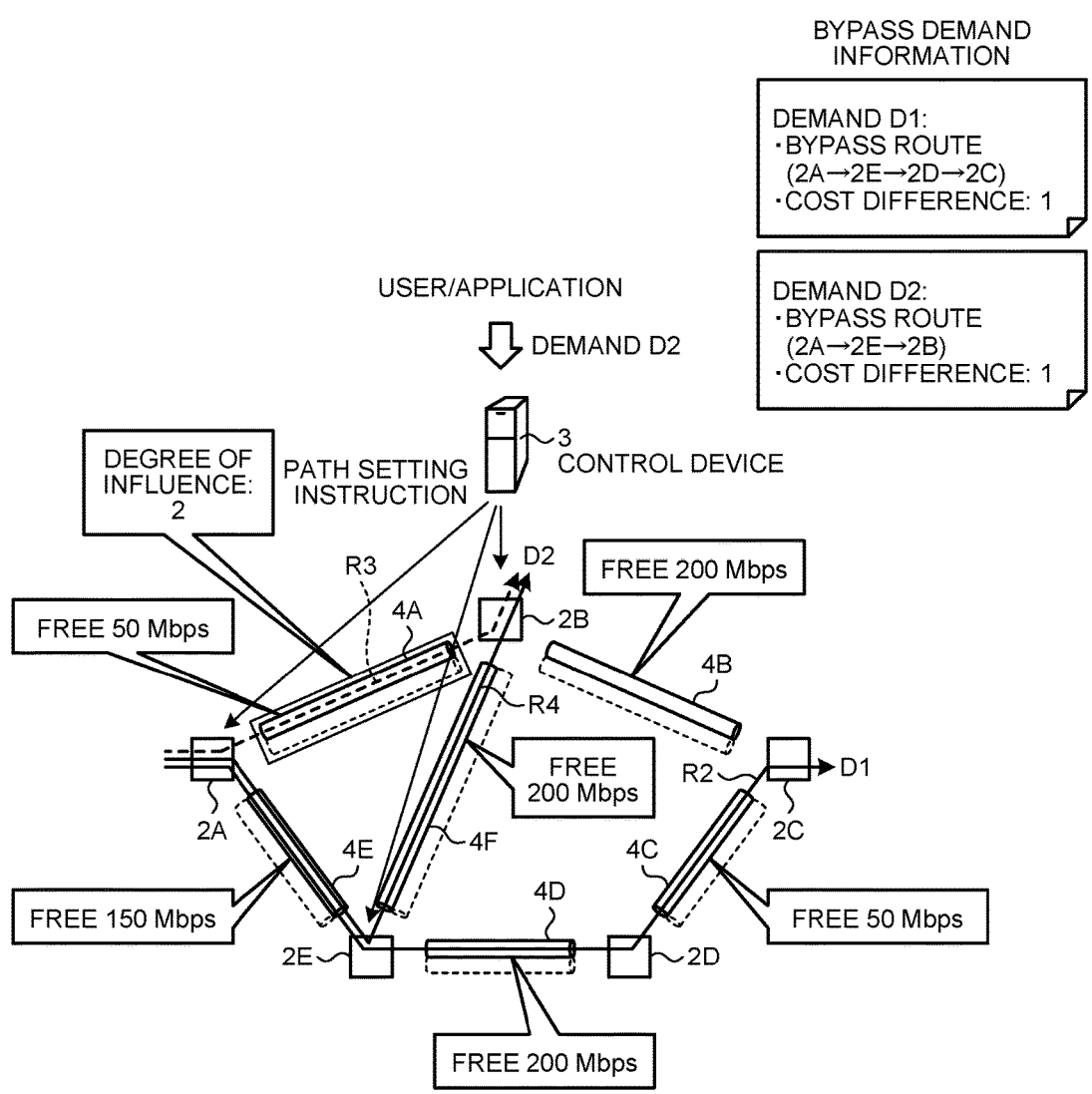
FIG. 5 is an explanatory diagram illustrating an example of a path configuration of the optical transfer system at the time of occurrence of a demand D2.

FIG. 5 is an explanatory diagram illustrating an example of a path configuration of the optical transfer system 1 at the time of occurrence of a demand D2. Assume that the demand processing unit 51 in the control device 3 has detected the demand D2. In the demand D2, the starting point is the first node 2A, the end point is the second node 2B, and the request bandwidth is 150 Mbps. In the optical NW of FIG. 5, the free bandwidth amount of the first section 4A is 50 Mbps, the free bandwidth amount of the second section 4B is 200 Mbps, the free bandwidth amount of the third section 4C is 50 Mbps, and the free bandwidth amount of the fourth section 4D is 200 Mbps. Further, the free bandwidth amount of the fifth section 4E is 150 Mbps, and the free bandwidth amount of the sixth section 4F is 200 Mbps.

When the calculation unit 52A has detected the demand D2, the calculation unit 52A calculates a candidate route R3 (2A→2B) of the optimum route of the demand D2, based on the starting point, the end point, and the QOS parameters in the demand D2. The candidate route R3 is a one-hop route of the first section 4A, and thus the route cost is "1". The first decision unit 52B decides that it is difficult for the wavelength link of the candidate route R3 to accommodate the demand D2 because the demand D2 is 150 Mbps, and the free bandwidth amount of the first section 4A of the candidate route R3 is 50 Mbps. The route determination unit 52C requests the calculation unit 52A to re-calculate the candidate route because it is difficult for the candidate route R3 to accommodate the demand D2.

The calculation unit 52A calculates a candidate route R4 (2A→2E→2B) of the bypass route with the next minimum route cost to the candidate route R3. The candidate route R4 is a two-hop route of the fifth section 4E and the sixth section 4F, and thus the route cost is "2". The first decision unit 52B decides that the candidate route R4 can accommodate the demand D2 because the free bandwidth amount of the fifth section 4E and the sixth section 4F of the candidate route R4 is equal to or more than 150 Mbps, which is the request bandwidth of the demand D2. The route determination unit 52C determines the candidate route R4 as the accommodation route that accommodates the demand D2. The path request unit 54 then requests the nodes 2 on the candidate route R4, that is, the first node 2A, the fifth node 2E, and the second node 2B to execute path setting of the accommodation route. The control unit 52D then updates the free bandwidth amount of each wavelength link in each section in the optical NW and stores the amounts in the wavelength link storage unit 42.

The evaluation unit 53 adds the cost difference "1" between the route cost "1" of the optimum route R3 of the demand D2 and the route cost "2" of the bypass route R4 to the degree of influence corresponding to the first section 4A that is the bypass factor to update the degree of influence in the degree of influence storage unit 43. That is, the degree of influence of the first section 4A is "2".

Figure 6:
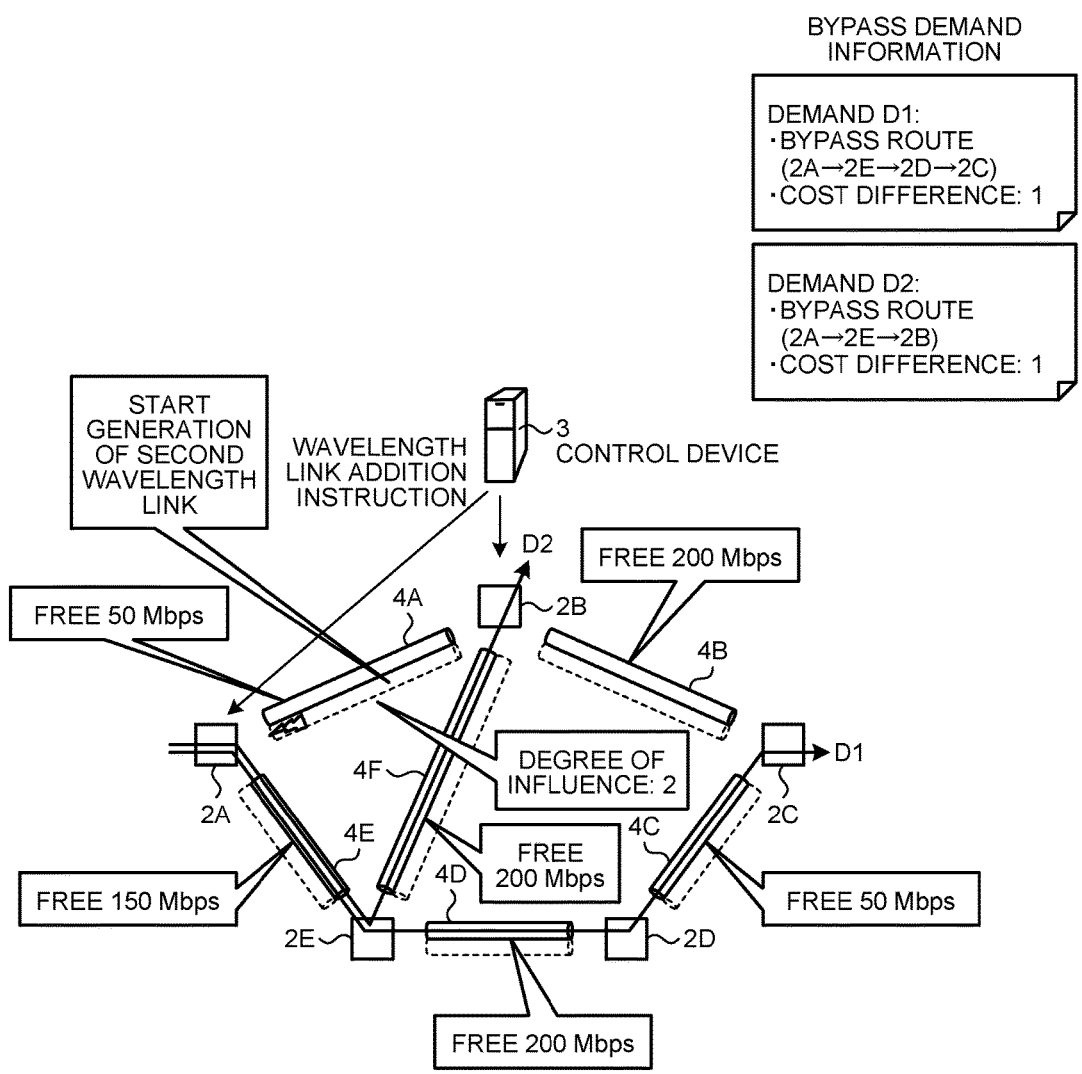
FIG. 6 is an explanatory diagram illustrating an example of a path configuration of the optical transfer system at the time of addition of a wavelength link.

FIG. 6 is an explanatory diagram illustrating an example of a path configuration of the optical transfer system 1 at the time of addition of a wavelength link. When the second decision unit 53A of the evaluation unit 53 in the control device 3 refers to the wavelength link information stored in the wavelength link storage unit 42 and has detected change of the free bandwidth amount of the wavelength link, the second decision unit 53A refers to the degree of influence storage unit 43. The second decision unit 53A decides whether the degree of influence of the section stored in the degree of influence storage unit 43 is a predetermined value "2" or more. The link request unit 55 decides whether there is the wavelength link that can be added to the first section 4A because the degree of influence of the first section 4A is the predetermined value or more. Note that existence/non-existence of the wavelength link that can be added has the maximum number of wavelengths usable in each node 2. Therefore, the link request unit 55 confirms whether the wavelength is an unused wavelength commonly usable in the first node 2A and the second node 2B of the first section 4A. For example, the nodes 2 can use five wavelengths λ1 to λ5, and the first node 2A has used the wavelength links of λ1 and λ2 in the first section 4A and the fifth section 4E. Further, the second node 2B has used the wavelength links of λ1, λ2, and λ3 in the first section 4A, the second section 4B, and the sixth section 4F. As a result, the wavelength link that can be added in the first section 4A is the wavelength links of λ4 and λ5 that are unused in the first node 2A and the second node 2B.

When there is the wavelength link that can be added to the first section 4A, the link request unit 55 in FIG. 6 requests the first node 2A and the second node 2B on the first section 4A to add the wavelength link. The control unit 52D then deletes and updates (clears) the first section 4A and the degree of influence from the section 43A and the degree of influence 43B in the degree of influence storage unit 43 when the control unit 52D has instructed addition of the wavelength link to the first section 4A.

Figure 7:
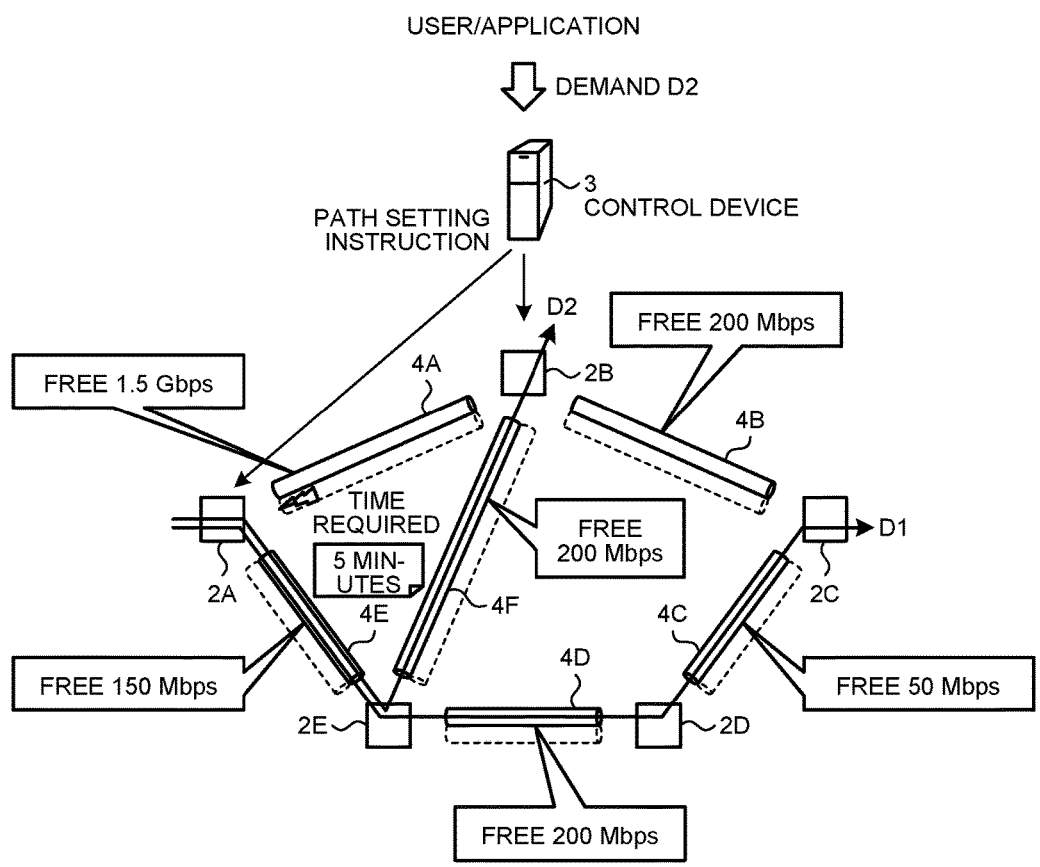
FIG. 7 is an explanatory diagram illustrating an example of a path configuration of the optical transfer system until operation start of a wavelength link.

FIG. 7 is an explanatory diagram illustrating an example of a path configuration of the optical transfer system 1 until operation start of a wavelength link. When the first node 2A and the second node 2B have received a request of addition of the wavelength link from the link request unit 55 of the control device 3, the first node 2A and the second node 2B execute processing of adding the wavelength link to the first section 4A.

In FIG. 7, the control device 3 calculates an operation start time to start the operation of the added wavelength link after the elapse of a predetermined time from the addition request of the wavelength link, for example, after five minutes. The control unit 52D updates the free bandwidth amount of each wavelength link of each section in the optical NW in response to the operation start of the wavelength link of the first section 4A. As a result, the free bandwidth amount of the first section 4A is increased by the bandwidth amount of the wavelength link.

Figure 8:
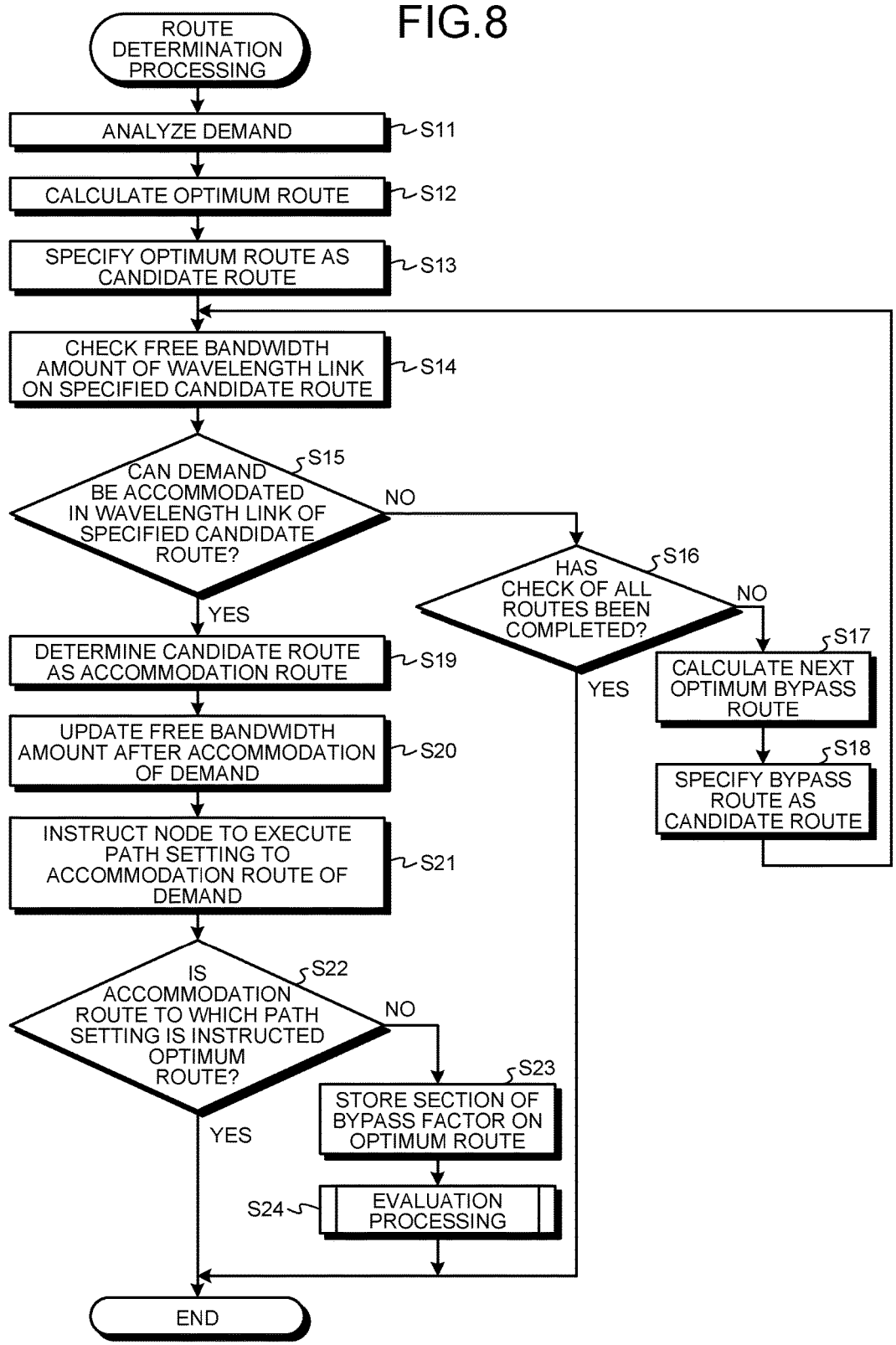
FIG. 8 is a flowchart illustrating an example of a processing operation of a processor in the control device in regard to route determination processing.

FIG. 8 is a flowchart illustrating an example of a processing operation of the processor 37 in the control device 3, in regard to route determination processing. The route determination processing illustrated in FIG. 8 is processing of determining the route in which the demand is accommodated, based on the demand information and the wavelength link information in response to the demand request.

In FIG. 8, the calculation unit 52A in the processor 37 in the control device 3 analyzes the starting point, the end point, and the QOS parameters in the demand (step S11). The calculation unit 52A calculates the optimum route in which the demand is to be accommodated, based on the starting point, the end point, and the QOS parameters in the demand (step S12). The calculation unit 52A specifies the optimum route obtained by the calculation, as the candidate route (step S13).

The first decision unit 52B in the processor 37 detects the free bandwidth amount of each wavelength link in each section on the specified candidate route, based on the wavelength link information (step S14). The first decision unit 52B decides whether the demand can be accommodated in the sections on the specified candidate route (step S15). When the demand cannot be accommodated in the sections on the candidate route (No in step S15), the calculation unit 52A decides whether all checks of the bypass route for the demand have been completed (step S16).

When all checks of the bypass route for the demand have not been completed (No in step S16), the calculation unit 52A calculates the bypass route with the next minimum route cost for the demand (step S17). The calculation unit 52A specifies the bypass route obtained by the calculation, as the candidate route (step S18), and is moved onto step S14 in order to detect the free bandwidth amount of each wavelength link in each section on the specified candidate route.

When the demand can be accommodated in the sections on the specified route candidate (Yes in step S15), the route determination unit 52C determines the candidate route as the accommodation route of the demand (step S19). After determining the accommodation route in which the demand is accommodated, the control unit 52D in the processor 37 updates the free bandwidth amount of the wavelength links in the sections in the optical NW and stores the updated information in the wavelength link storage unit 42 (step S20).

After determining the accommodation route in which the demand is accommodated, the path request unit 54 in the processor 37 requests the nodes 2 on the sections on the accommodation route to execute path setting to accommodate the demand in the accommodation route (step S21). The control unit 52D decides whether the accommodation route of the path setting is the optimum route for the demand (step S22).

When the accommodation route of the path setting is the optimum route for the demand (Yes in step S22), the control unit 52D terminates the processing operation illustrated in FIG. 8. When the accommodation route of the path setting is not the optimum route for the demand (No in step S22), the evaluation unit 53 stores the section of the bypass factor on the optimum route in the degree of influence storage unit 43 (step S23). When there is a plurality of sections of the bypass factor, the evaluation unit 53 stores the plurality of sections in the degree of influence storage unit 43. The evaluation unit 53 stores the sections on the optimum route, which are the bypass factor, in the degree of influence storage unit 43, then executes the evaluation processing illustrated in FIG. 9 in order to update the degree of influence for each section (step S24), and terminates the processing operation illustrated in FIG. 8. When all checks of the bypass route for the demand have been completed (Yes in step S16), the calculation unit 52A terminates the processing operation illustrated in FIG. 8.

The processor 37 that executes the route determination processing illustrated in FIG. 8 specifies the optimum route for the demand, and calculates the bypass route when it is difficult for the request bandwidth of the demand to be accommodated in the wavelength link on the section of the specified optimum route. Further, the processor 37 accommodates the demand in the bypass route when the request bandwidth of the demand can be accommodated in the wavelength link on the section of the bypass route obtained by the calculation. As a result, the demand can be accommodated in the bypass route other than the optimum route.

Further, the processor 37 searches for the bypass route with the next minimum route cost when it is difficult for the request bandwidth of the demand to be accommodated in the wavelength link on the section of the bypass route, and accommodates the demand in the bypass route when the request bandwidth of the demand can be accommodated in the wavelength link on the section of the found bypass route. As a result, the demand can be accommodated in the bypass route other than the optimum route.

Figure 9:
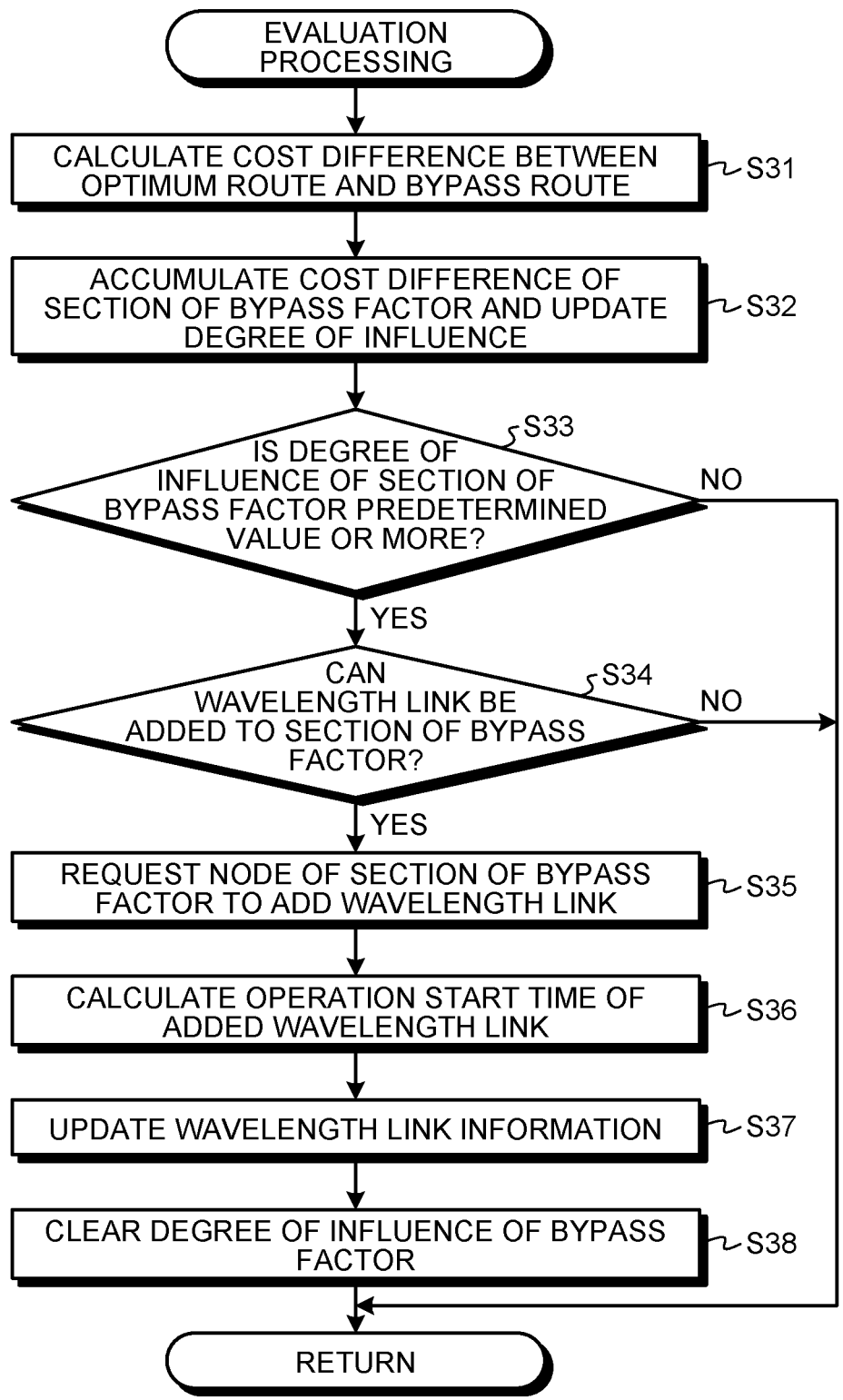
FIG. 9 is a flowchart illustrating an example of a processing operation of the processor in the control device in regard to evaluation processing.

FIG. 9 is a flowchart illustrating an example of a processing operation of the processor 37 in the control device 3 that executes the evaluation processing. The evaluation processing illustrated in FIG. 9 is processing of adding and storing the degree of influence for each section on the optimum route, which is the bypass factor, when the demand is accommodated in the bypass route, instead of in the optimum route.

In FIG. 9, the evaluation unit 53 calculates the cost difference between the route cost of the optimum route for the demand and the route cost of the determined bypass route (step S31). The evaluation unit 53 adds the calculated cost difference to the degree of influence corresponding to the section of the bypass factor on the optimum route, and stores the degree of influence in the degree of influence storage unit 43 (step S32).

The second decision unit 53A in the evaluation unit 53 decides whether the degree of influence corresponding to the section stored in the degree of influence storage unit 43 is the predetermined value or more (step S33). When the degree of influence corresponding to the section of the bypass factor is the predetermined value or more (Yes in step S33), the link request unit 55 refers to the wavelength link storage unit 42 and the information storage unit 44, and decides whether a new wavelength link can be added to the section of the bypass factor (step S34).

When the new wavelength link can be added to the section of the bypass factor (Yes in step S34), the link request unit 55 requests the nodes 2 related to the section of the bypass factor to add the new wavelength link (step 335). As a result, the nodes 2 related to the section of the bypass factor add the new wavelength link.

After adding the wavelength link to the nodes 2 related to the section of the bypass factor, the control unit 52D calculates the operation start time of the added wavelength link (step S36). Note that the operation start time is a time used from the time of the addition instruction of the wavelength link, for example, a time after the elapse of five minutes. The control unit 52D updates the wavelength link information in the wavelength link storage unit 42 (step S37). Further, the control unit 52D deletes and updates the section of the bypass factor and the degree of influence from the degree of influence storage unit 43 (step S38), and terminates the processing operation illustrated in FIG. 9.

When the degree of influence of the section of the bypass factor is not the predetermined value or more (No in step S33), or when the new wavelength link is not added to the section of the bypass factor (No in step S34), the control unit 52D terminates the processing operation illustrated in FIG. 9.

When the demand is accommodated in the bypass route other than the optimum route, the processor 37 that executes the evaluation processing illustrated in FIG. 9 identifies the cost difference between the route cost of the optimum route and the route cost of the bypass route as the degree of influence, and adds the degree of influence for each section on the optimum route, which is the bypass factor. Further, when the degree of influence of each section on the optimum route is the predetermined value or more, the processor 37 requests the section to add the wavelength link. As a result, addition of the wavelength link to the section of the bypass factor with a high possibility of use can suppress a decrease in the use efficiency of the wavelength link.

When the wavelength links of the sections in the optimum route for the demand do not have the free bandwidth where the demand can be accommodated, the control device 3 of the first embodiment accommodates the demand in the bypass route. Further, the control device 3 integrates the degrees of influence of the sections on the optimum route, based on the difference in the route cost between the optimum route for the demand and the bypass route. As a result, the control device 3 can recognize the section that becomes the bypass factor with a high possibility of use, based on the degrees of influences of the sections.

The control device 3 requests the nodes 2 of the sections in the optimum route to add the wavelength link to the wavelength bandwidth of the section having the degree of influence that has become a predetermined value or more. As a result, the wavelength link is added to the section that becomes the bypass factor with a high possibility of use, using the degree of influence. Therefore, the decrease in the use efficiency of the wavelength resource in the optical NW can be suppressed.

In the present embodiment, the wavelength link is not immediately added to the route used by the demand, and the wavelength link is added to the section that has a high possibility of being added with the demand, using the degree of influence. Furthermore, the degree of possibility that the demand is further used for the section can be recognized based on the degree of influence of each section of the bypass factor.

In the first embodiment when the new demand has been detected after the wavelength link is added to the section of the bypass factor, the new demand can be accommodated in the section to which the wavelength link has been added. However, when the wavelength link is added to the section of the bypass factor, the demand accommodated in the bypass route may be accommodated in the section to which the wavelength link has been added. An embodiment of this case will be described below as a second embodiment. Note that the same reference sign is added to the same configuration as the optical transfer system 1 of the first embodiment, and description of overlapping configurations and operations is omitted.

[b] Second Embodiment

Figure 10:
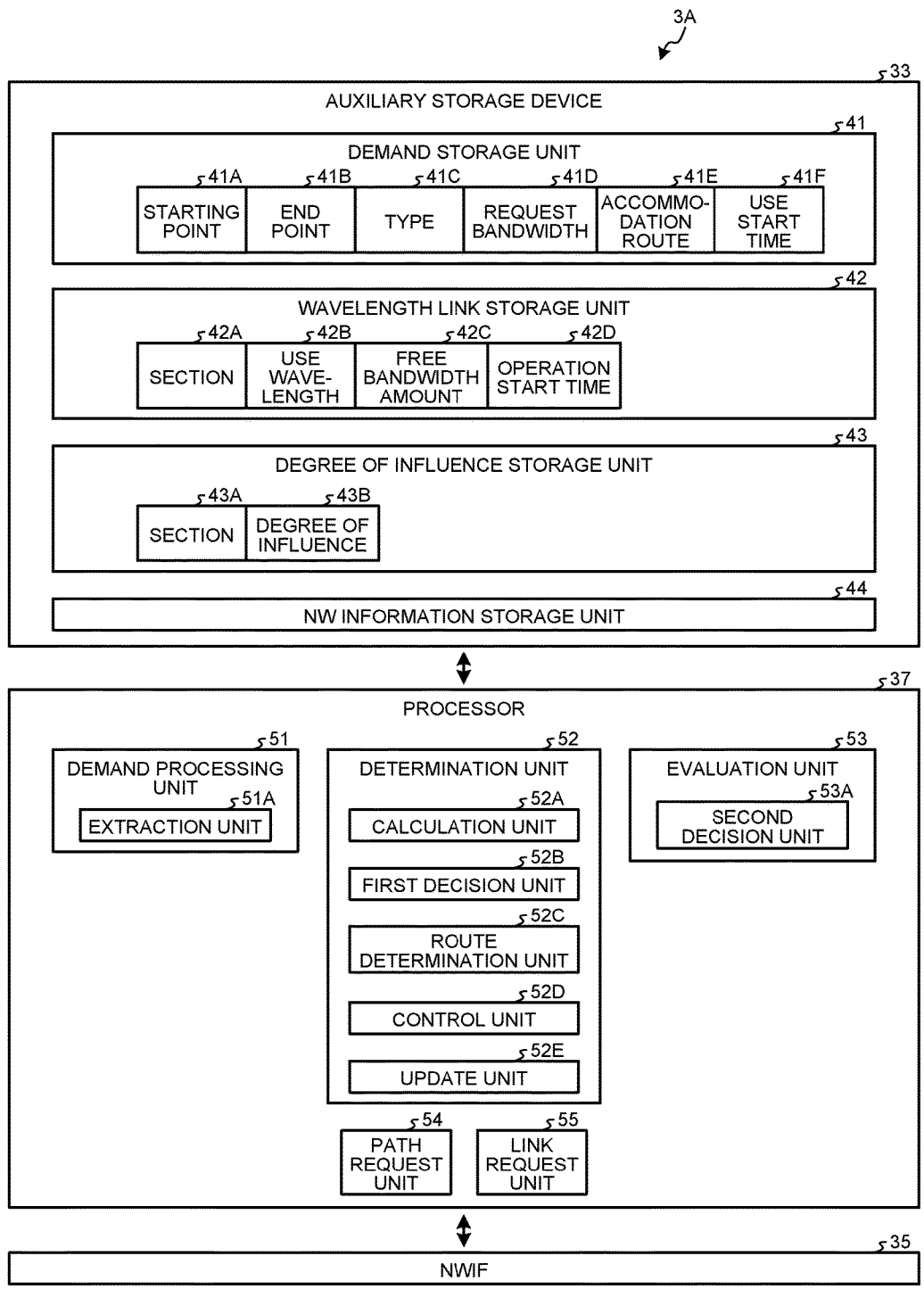
FIG. 10 is a block diagram illustrating an example of functional configurations of a control device of a second embodiment.

FIG. 10 is a block diagram illustrating an example of functional configurations of a control device 3 of a second embodiment. A demand storage unit 41 illustrated in FIG. 10 stores a use start time 41F of a demand, in addition to a starting point 41A, an end point 41B, a type 41C, a request bandwidth 41D, and an accommodation route 41E. Note that the use start time 41F is a time to start use of a wavelength link when the demand type is a reservation type.

A determination unit 52 includes an update unit 52E, in addition to a calculation unit 52A, a first decision unit 52 Bandwidth a route determination unit 52C. The update unit 52E decides whether a type of a demand is the reservation type when there is a demand accommodated, in a bypass route after adding the wavelength link in a section.

When the type of the demand is the reservation type, the update unit 52E requests the calculation unit 52A to re-calculate an optimum route of the demand. The first decision unit 52B decides whether the demand can be accommodated in the optimum route obtained by the re-calculation. When the demand can be accommodated in the optimum route obtained by the re-calculation, the update unit 52E refers to the demand storage unit 41 and a wavelength link storage unit 42, and decides whether the use start time of the demand is on or after an operation start time of the optimum route.

When the use start time of the demand is on or after the operation start time of the optimum route obtained by the re-calculation, the update unit 52E determines the optimum route obtained by the re-calculation as an accommodation route in order to accommodate the demand accommodated in the bypass route. A path request unit 54 requests nodes 2 on the optimum route to execute path setting in order to accommodate the demand accommodated in the bypass route, in the optimum route obtained by the re-calculation, in response to the use start time of the demand.

Figure 11:
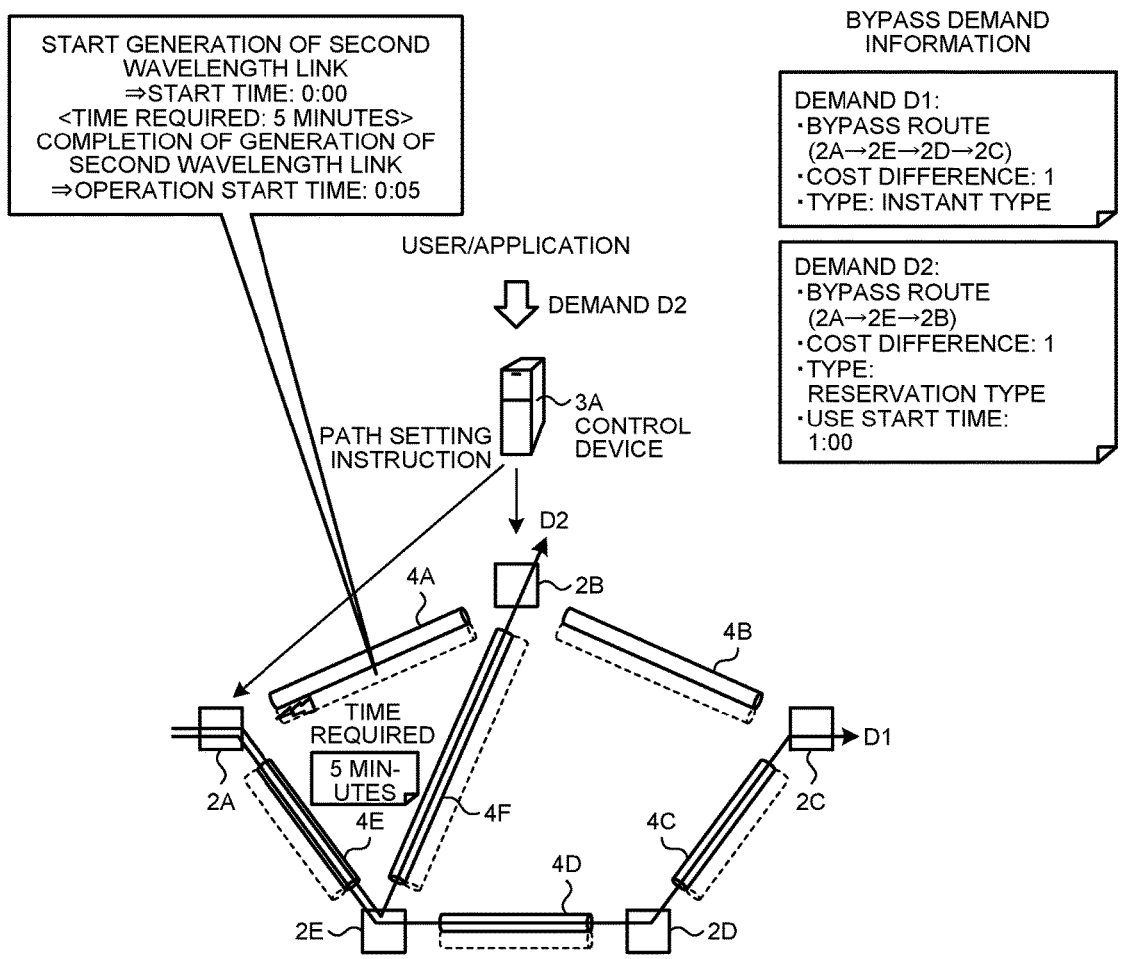
FIG. 11 is an explanatory diagram illustrating an example of a path configuration of an optical transfer system of the second embodiment.

Next, an operation of an optical transfer system 1 of the second embodiment will be described. FIG. 11 is an explanatory diagram illustrating an example of a path configuration of the optical transfer system 1 of the second embodiment. An optical NW illustrated in FIG. 11 accommodates a demand D2 in a first section 4A and a sixth section 4F, as the bypass route of the demand D2. A link request unit 55 in the control device 3 requests a first node 2A and a second node 2B on the first section 4A to add the wavelength link. At this time, in a case where a start time of the addition request of the wavelength link is 0:00, the link request unit 55 stores 0:05 that is a time obtained by adding 5 minutes that is a time used until the wavelength link added to the first section 4A becomes operable, to the start time, in a wavelength link storage unit 42, as the operation start time. A control unit 52D updates wavelength link information related to the added wavelength link in the wavelength link storage unit 42.

Further, the update unit 52E extracts the use start time of the demand D2 accommodated in the bypass route. When the use start time of the demand D2 is on or after the operation start time of the first section 4A, the update unit 52E requests the calculation unit 52A to re-calculate the optimum route of the demand D2.

The calculation unit 52A calculates the first section 4A as the optimum route of the demand D2. The update unit 52E decides that a request bandwidth of the demand D2 accommodated in the bypass route can be accommodated in the first section 4A of the calculated optimum route.

Figure 12:
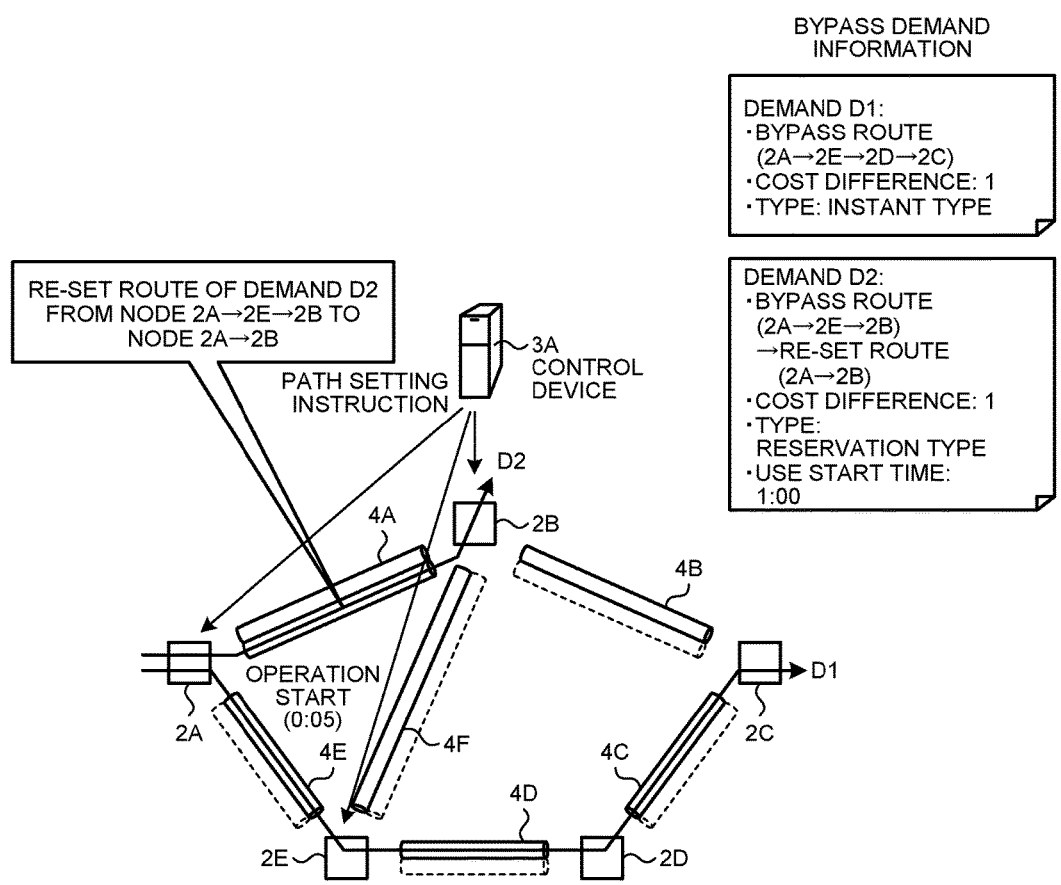
FIG. 12 is an explanatory diagram illustrating an example of a path configuration of the optical transfer system of when an accommodation route of a reservation type demand is changed.

FIG. 12 is an explanatory diagram illustrating an example of a path configuration of the optical transfer system 1 of when the accommodation route of a reservation-type demand is changed. When a current time has reached the operation start time of the first section 4A of the optimum route, the path request unit 54 requests the nodes 2 to execute path setting in order to accommodate the demand D2 in the first section 4A of the optimum route from the bypass route in which the demand D2 is being accommodated. As a result, as illustrated in FIG. 12, the optical NW accommodates the demand D2 in the first section 4A of the optimum route from the bypass route in which the demand D2 is being accommodated.

Figure 13:
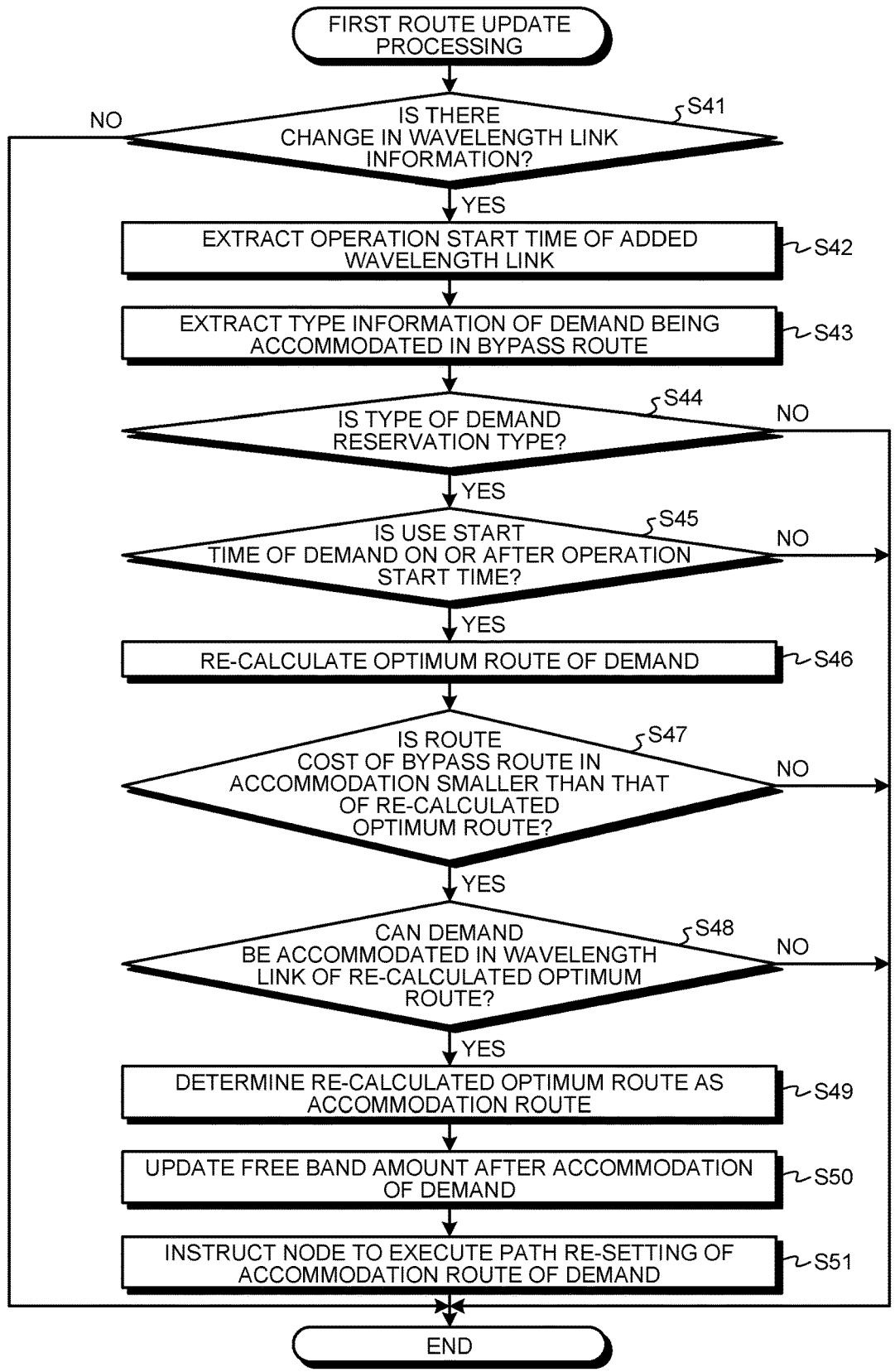
FIG. 13 is a flowchart illustrating an example of a processing operation of a processor in a control device in regard to first route update processing.

FIG. 13 is a flowchart illustrating an example of a processing operation of a processor 37 of a control device 3A related to first route update processing. The first route update processing illustrated in FIG. 13 is processing of accommodating the demand in the optimum route from the bypass route, when the demand being accommodated in the bypass route is the reservation type and the use start time of the demand is on or after the operation start time, after the wavelength link is added to the section of the bypass factor.

In FIG. 13, the update unit 52E in the processor 37 refers to the wavelength ink information stored in the wavelength link storage unit 42, and decides whether there is change in the wavelength link information (step S41). Note that the update unit 52E recognizes the change in the wavelength link information by addition of a free bandwidth amount and the operation start time of each wavelength link. When there is change in the wavelength link information (Yes in step S41), the update unit 52E extracts the operation start time of the added wavelength link from the wavelength link storage unit 42 (step S42).

The update unit 52E extracts the type of the demand being accommodated in the bypass route from a demand storage unit 41 (step S43). The update unit 52E decides whether the type of the demand is the reservation type (step S44). When the type of the demand is the reservation type (Yes in step S44), the update unit 52E decides whether the use start time of the demand is on or after the operation start time of the added wavelength link (step S45). When the use start time of the demand is on or after the operation start time of the added wavelength link (Yes in step S45), the calculation unit 52A re-calculates the optimum route of the demand, based on the wavelength link information (step S46).

The update unit 52E decides whether a route cost of the bypass route that is accommodating the demand is smaller than a route cost of the optimum route obtained by the re-calculation (step S47). When the route cost of the bypass route that is accommodating the demand is smaller than the route cost of the re-calculated optimum route (Yes in step S47), the first decision unit 52B decides whether the demand can be accommodated in the optimum route obtained by the re-calculation (step S48).

When the demand can be accommodated in the optimum route obtained by the re-calculation (Yes in step S48), a route determination unit 52C determines the optimum route obtained by the re-calculation as the accommodation route (step S49). The control unit 52D stores and updates the free bandwidth, amount after accommodation of the demand of each wavelength link in the sections in the optical NW, in the wavelength link storage unit 42 (step S50).

The path request unit 54 requests the nodes 2 on the optimum route to execute path re-setting in order to accommodate the demand being accommodated in the bypass route to the optimum route obtained by the re-calculation (step S51), and terminates the processing operation illustrated in FIG. 13.

When there is no change in the wavelength link information (No in step S41), the update unit 52E terminates the processing operation illustrated in FIG. 13. When the type of the demand is not the reservation type (No in step S44) the update unit 52E terminates the processing operation illustrated in FIG. 13. When the use start time of the demand is not on or after the operation start time (No in step S45), the update unit 52E terminates the processing operation illustrated in FIG. 13. Further, when the route cost of the optimum route obtained by the re-calculation is not smaller than the route cost of the bypass route that is accommodating the demand (No in step S47), the update unit 52E terminates the processing operation illustrated in FIG. 13. When the demand cannot be accommodated in the optimum route obtained by the re-calculation (No in step S48), the update unit 52E terminates the processing operation illustrated in FIG. 13.

The processor 37 that executes the first route update processing illustrated in FIG. 13 re-calculates the optimum route for the demand, when the type of the demand being accommodated in the bypass route is the reservation type, and the use start time of the demand is on or after the operation start time of the section after addition of the wavelength link, after the wavelength ink is added to the section. Further, the processor 37 re-sets the path to accommodate the demand being accommodated in the bypass route to the optimum route, when the route cost of the optimum route obtained by the re-calculation is smaller than the route cost of the bypass route that is accommodating the demand, and the demand can be accommodated in the optimum route obtained by the re-calculation. As a result, the control device 3A can provide the optimum route to the demand, when the demand being accommodated in the bypass route is the reservation type after addition of the wavelength link.

The control device 3A of the present second embodiment re-calculates the optimum route for the demand being accommodated in the bypass route, after the wavelength link is added to the section. The control device 3A accommodates the demand obtained by the re-calculation to the optimum route, when there is a free bandwidth in the wavelength bandwidth of the optimum route obtained by the re-calculation, and the use start time of the demand is on or after the operation start time of the section on the optimum route, to which the wavelength link has been added. As a result, the control device 3A can provide the optimum route to the demand, when the demand being accommodated in the bypass route is the reservation type, after addition of the wavelength link.

Note that, in the second embodiment, the types including the reservation type/instant type are included in the demand. However, a use type of the instant type or the reservation type may be able to be set in advance, as a service menu in making a service subscription contract with a telecommunication carrier.

In the second embodiment, the demand being accommodated in the bypass route is accommodated in the optimum route, when the type of the demand being accommodated in the bypass route is the reservation type, and the demand can be accommodated in the optimum route. However, the type of the demand is not limited to the reservation type, and a momentary interruption toleration type is also applicable, and an embodiment of that case will be described below as a third embodiment. Note that the same configuration as the optical transfer system 1 of the second embodiment will be denoted with the same reference sign, and description of overlapping configurations and operations will be omitted.

[c] Third Embodiment

After a wavelength link is added to a section that is a bypass factor, an update unit 52E decides whether a type of a demand is a momentary interruption toleration type, when there is a demand being accommodated in a bypass route. Note that momentary interruption is communication disconnection that temporarily occurs by route switching in a node 2 or the like due to route change, for example. A momentary interrupt ion non-toleration-type demand is a line switching signal such as synchronous optical network/synchronous digital hierarchy (SONET/SDH). In contrast, a momentary interruption toleration-type demand is a packet signal, data of which can be re-sent in a higher-order layer in an optical NW.

When the type of the demand is the momentary interruption toleration type, the update unit 52E requests a calculation unit 52A to re-calculate an optimum route of the demand. A first decision unit 52B decides whether the demand can be accommodated in an optimum route obtained by the re-calculation. When the demand can be accommodated in the optimum route obtained by the re-calculation, the update unit 52E determines the optimum route obtained by the re-calculation as an accommodation route in order to accommodate the demand being accommodated in a bypass route. When a current time is on or after an operation start time of the optimum route obtained by the re-calculation, a path request unit 54 requests nodes 2 on the optimum route to execute path setting in order to accommodate the demand being accommodated in the bypass route to the optimum route obtained by the re-calculation.

Next, an operation of an optical transfer system 1 of the third embodiment will be described. As illustrated in FIG. 11, in the optical NW, a demand D2 is accommodated in a first section 4A and a sixth section 4F, as the bypass route of the demand D2. In this case, the demand D2 is the momentary interruption toleration-type demand. A link request unit 55 in a control device 3A requests a first node 2A and a second node 2B on the first section 4A to add a wavelength link. At this time, the link request unit 55 calculates, in a case where a start time of the addition request of the wavelength link is 0:00, 0:05 that is a time obtained by adding 5 minutes that is a time used until the added wavelength link becomes operable in the first section 4A, to the start time, as the operation start time. Further, the link request unit 55 stores the calculated operation start time of each wavelength link in a wavelength link storage unit 42. A control unit 52D updates wavelength link information related to the added wavelength link in the wavelength link storage unit 42.

Further, the update unit 52E requests the calculation unit 52A to re-calculate the optimum route of the demand D2, when the demand D2 accommodated in the bypass route is the momentary interruption toleration type. The calculation unit 52A calculates the first section 4A as the optimum route of the demand D2. Assume that the update unit 52E decides that a request bandwidth of the demand D2 being accommodated in the bypass route can be accommodated in the first section 4A of the optimum route obtained by the re-calculation.

Figure 14:
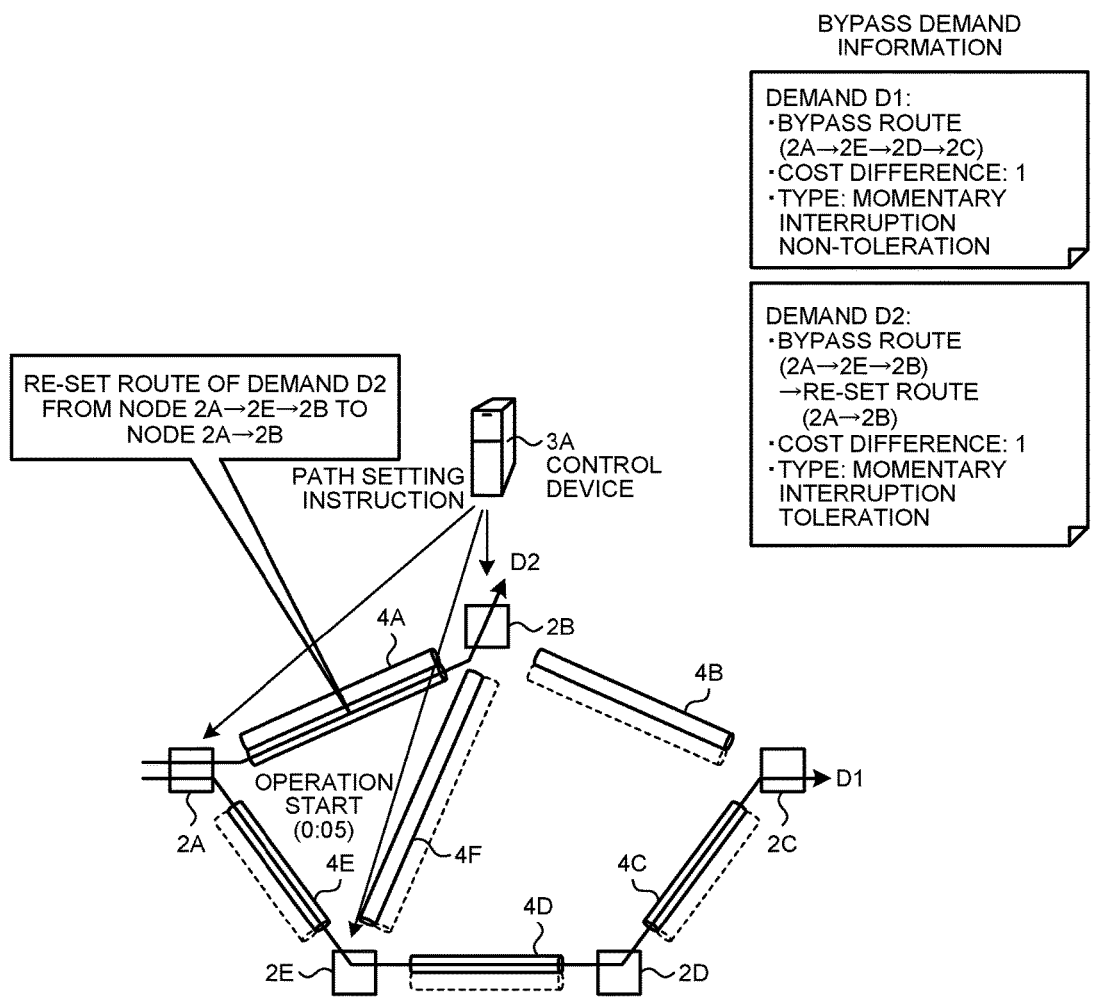
FIG. 14 is an explanatory diagram illustrating an example of a path configuration of the optical transfer system of when an accommodation route of a momentary interruption toleration-type demand is changed.

FIG. 14 is an explanatory diagram illustrating an example of a path configuration of an optical transfer system 1 of when an accommodation route of the momentary interruption toleration type demand is changed. When a current time has reached the operation start time of the first section 4A of the optimum route obtained by the re-calculation, the path request unit 54 requests nodes 2 to execute path re-setting in order to accommodate the demand D2 in the first section 4A of the optimum route from the bypass route that is accommodating the demand D2. As a result, as illustrated in FIG. 14, the optical NW accommodates the demand D2 in the first section 4A of the optimum route from the bypass route that is accommodating the demand D2.

Figure 15:
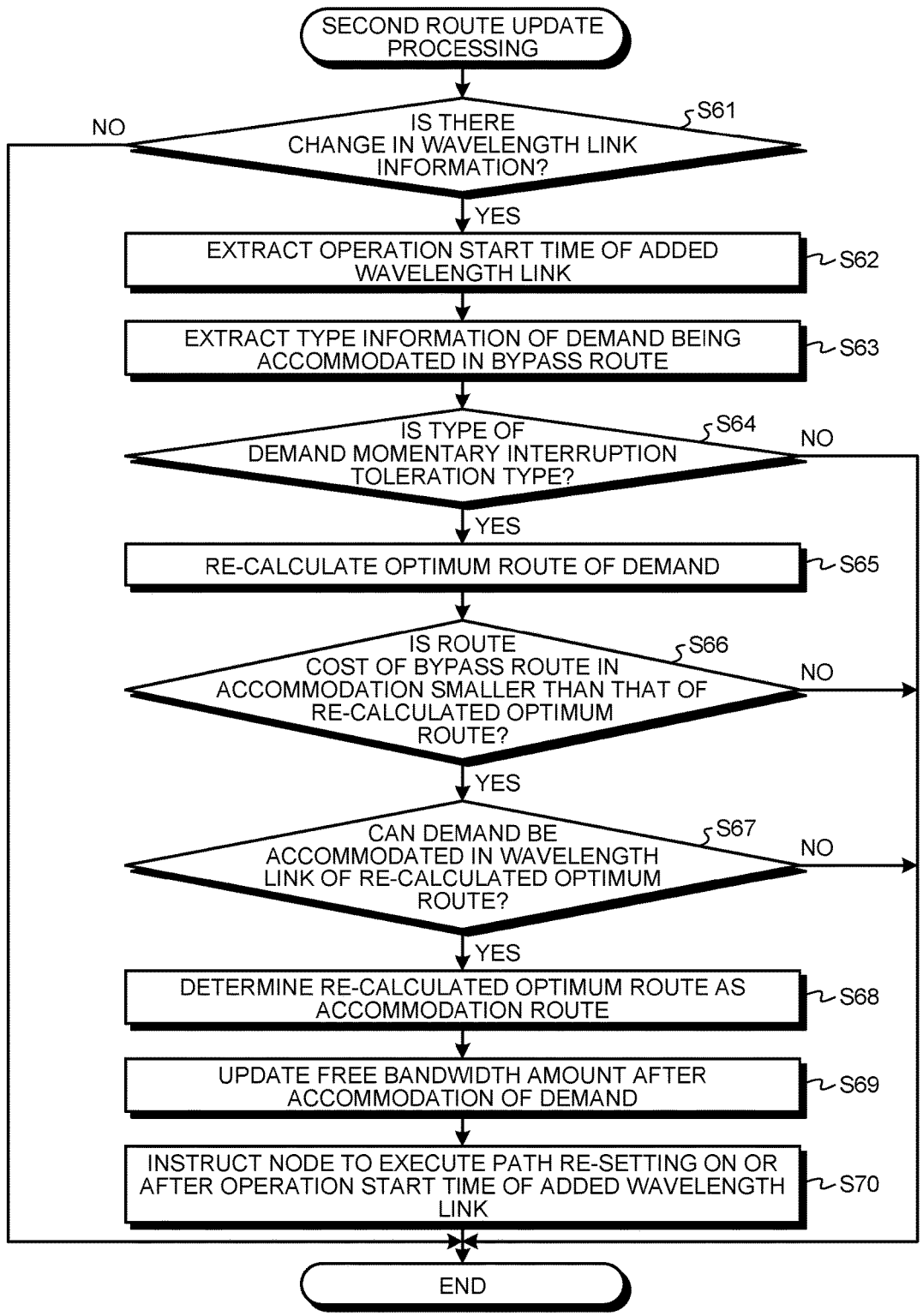
FIG. 15 is a flowchart illustrating an example of a processing operation of the processor in the control device in regard to second route update processing.

FIG. 15 is a flowchart illustrating an example of a processing operation of a processor 37 of the control device 3A, in regard to second route update processing. The second route update processing illustrated in FIG. 15 is processing of accommodating the demand in the optimum route from the bypass route, when the demand being accommodated in the bypass route is the momentary interruption toleration type, and the current time is on or after the operation start time, after the wavelength link is added to the section of the bypass factor.

In FIG. 15, an update unit 52E in the processor 37 refers to wave link information stored in the wavelength link storage unit 42, and decides whether there is change in the wavelength link information (step S61). When there is change in the wavelength link information (Yes in step S61), the update unit 52E extracts the operation start time of the added wavelength link from the wavelength link storage unit 42 (step S62).

The update unit 52E extracts the type of the demand being accommodated in the bypass route from a demand storage unit 41 (step S63). The update unit 52E decides whether the type of the demand is the momentary interruption toleration type (step S64). When the type of the demand is the momentary interruption toleration type (Yes in step S64), the calculation unit 52A re-calculates the optimum route of the demand, based on the wavelength link information (step S65).

The update unit 52E decides whether a route cost of the bypass route that is accommodating the demand is smaller than a route cost of the optimum route obtained by the re-calculation (step S66). When the route cost of the bypass route that is accommodating the demand is smaller than the route cost of the re-calculated optimum route (Yes in step S66), the first decision unit 52B decides whether the demand can be accommodated in the optimum route obtained by the re-calculation (step S67).

When the demand can be accommodated in the wavelength link of the optimum route obtained by the re-calculation (Yes in step S67), a route determination unit 52C determines the optimum route obtained by the re-calculation as an accommodation route (step S68). The control unit 52D stores and updates a free bandwidth amount after accommodation of the demand of each wavelength link in the sections in the optical NW, in the wavelength link storage unit 42 (step S69).

The path request unit 54 requests nodes 2 on the optimum route to execute path re-setting in order to accommodate the demand being accommodated in the bypass route to the optimum route obtained by the re-calculation, on or after the operation start time of the added wavelength link (step S70), and terminates the processing operation illustrated in FIG. 15.

When there is no change in the wavelength link information (No in step S61), the update unit 52E terminates the processing operation illustrated in FIG. 15. When the type of the demand is not the momentary interruption toleration type (No in step S64), the update unit 52E terminates the processing operation illustrated in FIG. 15. Further, when the route cost of the optimum route obtained by the re-calculation is not smaller than the route cost of the bypass route that is accommodating the demand (No in step S66), the update unit 52E terminates the processing operation illustrated in FIG. 15. When the demand cannot be accommodated in the optimum route obtained by the re-calculation (No in step S67), the update unit 52E terminates the processing operation illustrated in FIG. 15.

The processor 37 that executes the second route update processing illustrated in FIG. 15 re-calculates the optimum route for the demand, when the type of the demand being accommodated in the bypass route is the momentary interruption toleration type, after the wavelength link is added to the section. Further, when the route cost of the optimum route obtained by the re-calculation is smaller than the route cost of the bypass route that is accommodating the demand, and the demand can be accommodated in the optimum route obtained by the re-calculation, the processor 37 re-sets the path to accommodate the demand being accommodated in the bypass route to the optimum route. As a result, the control device 3A can provide the optimum route to the demand, when the demand being accommodated in the bypass route is the momentary interruption toleration type, after addition of the wavelength link.

The control device 3A of the present third embodiment accommodates the demand in the optimum route obtained by the re-calculation, when re-calculating the optimum route for the demand being accommodated in the bypass route after the wavelength link is added to the section, there is a free bandwidth in the wavelength bandwidth of the optimum route obtained by the re-calculation, and the demand is the momentary interruption toleration type. As a result, the control device 3A can provide the optimum route to the demand, when the demand being accommodated in the bypass route is the momentary interruption toleration type, after the wavelength link is added.

Note that, in the third embodiment, the types such, as the momentary interruption toleration type/momentary interruption non-toleration type are included in the demand. However, a use type of the momentary interruption toleration type or the momentary interruption non-toleration type may be able to be set in advance, as a service menu in making a service subscription contract with a telecommunication carrier.

In the present embodiment, the section that becomes the factor of the bypass route is detected, and the wavelength link is dynamically added. Therefore, an increase in the bypass route can be prevented, and the demand that can eliminate the bypass route with the added wavelength link is extracted, and the optimum route for the demand is re-set. As a result, a resource use amount of the wavelength link can be decreased, and resource use efficiency of the wavelength link of the optical NW can be improved.

In the above-described embodiment, when there is a plurality of demands that can be targets of the path re-setting of the bypass route, the path re-setting of the plurality of demands may be executed.

Further, when it is difficult for the path re-setting of all of the plurality of demands to be executed from a state of free bandwidths of the section that includes the added wavelength link at the present moment, an arbitrary demand is selected from among the plurality of demands, and the path re-setting may be executed. In this case, a cost difference between the route cost at the time of determination of the bypass route of the demand and the route cost of the optimum route is stored in advance, and a demand, to be updated may be preferentially selected from the demands in descending order of the cost difference. As a result, the path re-setting can be executed in order from the demand that largely decreases the use efficiency. Therefore, improvement effect of the use efficiency of the wavelength resource can be enhanced.

Further, the illustrated, configuration elements of the respective units are not necessarily physically configured as illustrated. That is, specific forms of dispersion/integration of the respective units are not limited to those illustrated, and all or a part of the specific forms may be functionally or physically dispersed/integrated in arbitrary units according to various loads and use states.

Further, all or an arbitrary part of the various processing functions performed in the respective devices may be executed on a central processing unit (CPU), a digital signal processor (DSP), or a field programmable gate array (FPGA). Further, all or an arbitrary part of the various processing functions may be executed on a program analyzed and executed by the CPU or on hardware by a wired logic.

The area in which the various types of information are stored may be configured from a read only memory (ROM), a synchronous dynamic random access memory (SDRAM), and a random access memory (RAM) such as a magnetoresistive random access memory (MRAM) or a non-volatile random access memory (NVRAM).

Figure 16:
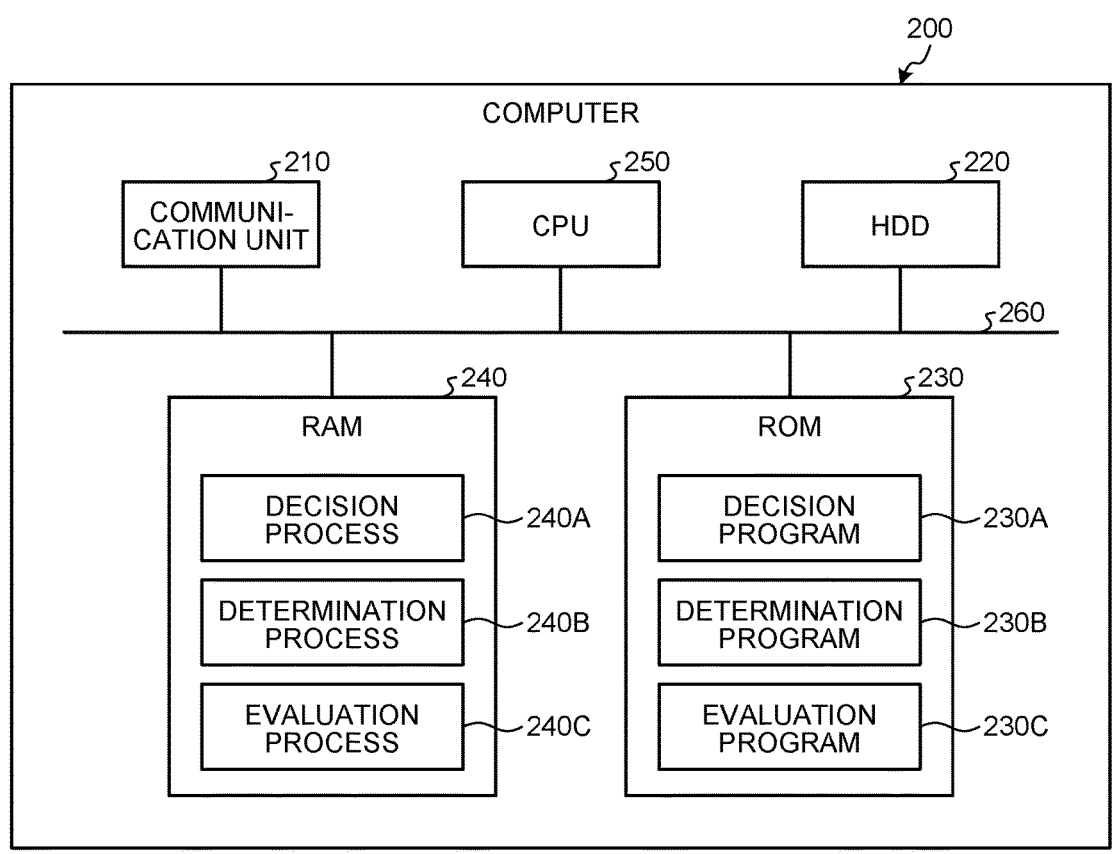
FIG. 16 is an explanatory diagram illustrating an example of a computer that executes a wavelength allocation program.
Figure 17A:
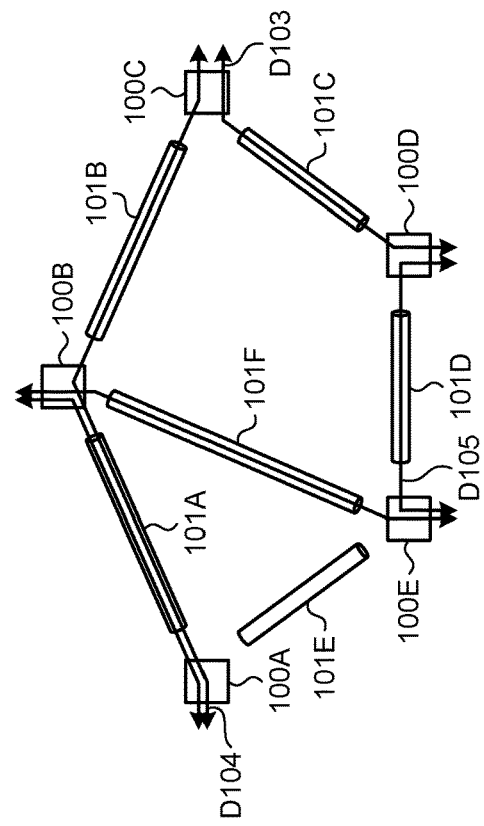
FIGS. 17A to 17D are explanatory diagrams illustrating an example of a path configuration of an optical transfer system.
Figure 17B:
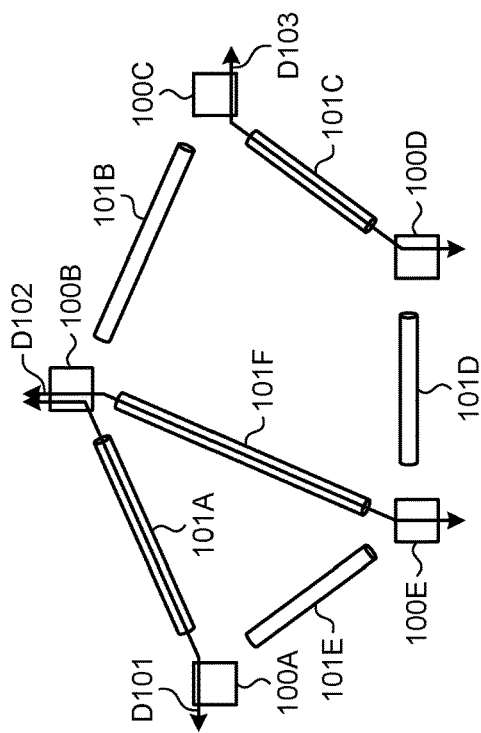
Figure 17D:
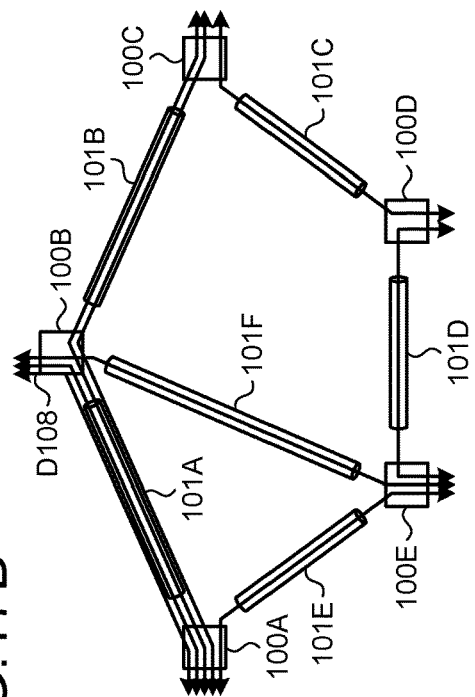
Figure 17C:
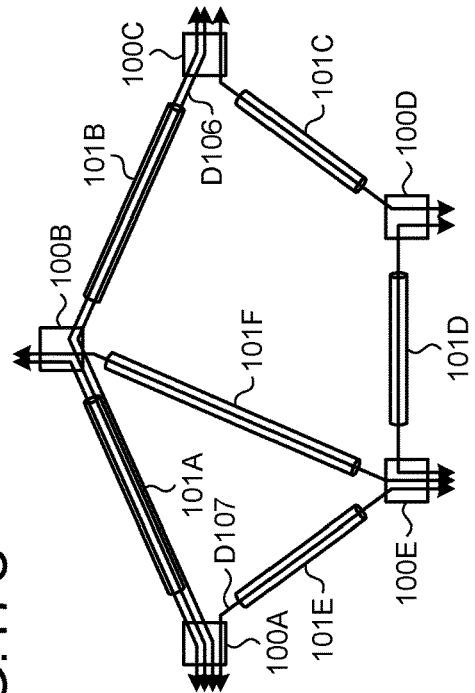

By the way, the various types of processing described in the present embodiment can be realized such that a program prepared in advance is executed by a processor such as the CPU in a computer. Therefore, hereinafter, an example of an information processing device that executes a program having a similar function to the above-described embodiments will be described. FIG. 16 is an explanatory diagram illustrating an example of a computer that executes the wavelength allocation program.

A computer 200 that executes the wavelength allocation program illustrated in FIG. 16 includes a communication unit 210, a hard disc driver (HDD) 220, a ROM 230, a RAM 240, and a CPU 250. The communication unit 210, the HDD 220, the ROM 230, the RAM 240, and the CPU 250 are connected through a bus 260. The communication unit 210 is connected with an optical transfer system that mutually connects a plurality of nodes by optical fibers, and connects route sections between the nodes by a wavelength link, to build an optical NW. When the CPU 250 has detected the demand, the CPU 250 calculates the route of the sections between the nodes in the optical transfer system to be allocated to the demand.

Wavelength allocation programs that exert similar functions to the above-described embodiments are stored in the ROM 230 in advance. A decision program 230A, a determination program 230B, and an evaluation program 230C are stored in the ROM 230, as the wavelength allocation programs. Note that the wavelength allocation programs may be recorded in a recording medium that can be read with a drive (not illustrated) by a computer, instead of the ROM 230. As the recording medium, a potable recording medium such as a CD-ROM, a DVD disc, or a USB memory, or a semiconductor memory such as a flash memory may be used.

The CPU 250 then reads the decision program 230A from the ROM 230, and functions as a decision process 240A on the RAM 240. Further, the CPU 250 reads the determination program 230B from the ROM 230, and functions as a determination process 240B on the RAM 240. The CPU 250 reads the evaluation program 230C from the ROM 230, and functions as an evaluation process 240C on the RAM 240.

The CPU 250 decides whether the wavelength bandwidth of the optimum route to the demand has a free bandwidth to which the demand can be allocated. When the wavelength bandwidth of the optimum route does not have a free bandwidth to which the demand can be allocated, the CPU 250 allocates the demand to the bypass route. The CPU 250 integrates the degrees of influence of the sections that do not have the free bandwidth on the optimum route to which the demand can be allocated, based on the difference in the route cost between the optimum route for the demand and the bypass route. As a result, the use efficiency of the wavelength resource is improved using the degree of influence of each section.

As one aspect, use efficiency of a wavelength resource can be improved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method of allocating a wavelength, the method comprising:
   first deciding whether a wavelength bandwidth of an optimum route for a demand has a free bandwidth to which the demand is able to be allocated;
   allocating the demand to a bypass route other than the optimum route when the wavelength bandwidth of the optimum route does not have the free bandwidth;
   acquiring a degree of influence of a section on the optimum route that is decided not to have the free bandwidth, by accumulating a difference in a route cost between the optimum route and the bypass route, the degree of influence being indicative of powerful influence on the bypass route when the demand is accommodated in the bypass route;
   second deciding whether the acquired degree of influence becomes a predetermined value or more;
   third deciding whether there is the wavelength link that can be added to the section in which the acquired degree of influence becomes a predetermined value or more;
   adding an unused wavelength link to the wavelength bandwidth of the section in which there is the wavelength link that can be added to the section, to activate a laser of a transmitter of the section, and set a filter of a receiver of the section to filter the wavelength in the added wavelength link;

re-calculating the optimum route for the demand being allocated to the bypass route, after adding the unused wavelength link to the wavelength bandwidth of the section; and allocating the demand to the optimum route obtained by the re-calculation in the case that the wavelength bandwidth of the optimum route obtained by the re-calculation has the free bandwidth, and a type of the demand is a momentary interruption toleration type that permits the momentary interruption of data.

2. The method of allocating a wavelength according to claim 1, the method comprising:

storing, in a storage unit, an operation start time in which the unused wavelength link becomes operable, in the case that the unused wavelength link is added to the wavelength bandwidth of the section; and allocating the demand obtained by the re-calculation to the optimum route obtained by the re-calculation, in the case that the wavelength bandwidth of the optimum route obtained by the re-calculation having the free bandwidth, and a use start time of the demand being on or after the operation start time of the unused wavelength link.

3. The method of allocating a wavelength according to claim 1, the method comprising:

allocating the demand to the optimum route obtained by the re-calculation, in the case that the wavelength bandwidth of the optimum route obtained by the re-calculation having the free bandwidth, and a type of the demand being momentary interruption toleration.

4. The method of allocating a wavelength according to claim 1, the method comprising:

storing, for each demand to which the bypass route is allocated, a cost difference between the optimum route and the bypass route for the demand in a storage unit; and in the case that there is a plurality of demands being allocated to the bypass route, after the unused wavelength link is added to the wavelength bandwidth of the section, selecting a demand to be updated from the plurality of demands, based on the cost difference in each demand in the storage unit, and re-calculating the optimum route for the selected demand.

5. A wavelength allocation device comprising a processor configured to:

decide whether a wavelength bandwidth of an optimum route for a demand has a free bandwidth to which the demand is able to be allocated;

allocate the demand to a bypass route other than the optimum route, in the case that the wavelength bandwidth of the optimum route does not have the free bandwidth;

acquire a degree of influence of a section on the optimum route that is decided not to have the free bandwidth, by accumulating a difference in a route cost between the optimum route and the bypass route, the degree of influence being indicative of powerful influence on the bypass route when the demand is accommodated in the bypass route;

decide whether the acquired degree of influence becomes a predetermined value or more;

decide whether there is the wavelength link that can be added to the section in which the acquired degree of influence becomes a predetermined value or more;

add an unused wavelength link to the wavelength bandwidth of the section in which there is the wavelength link that can be added to the section, to activate a laser of a transmitter of the section, and set a filter of a receiver of the section to filter the wavelength in the added wavelength link;

re-calculate the optimum route for the demand being allocated to the bypass route, after adding the unused wavelength link to the wavelength bandwidth of the section; and allocate the demand to the optimum route obtained by the re-calculation in the case that the wavelength bandwidth of the optimum route obtained by the re-calculation has the free bandwidth, and a type of the demand is a momentary interruption toleration type that permits the momentary interruption of data.

* * * * *